US008698910B2

(12) United States Patent
Aisaka et al.

(10) Patent No.: US 8,698,910 B2
(45) Date of Patent: Apr. 15, 2014

(54) APPARATUS, CAMERA, METHOD, AND COMPUTER-READABLE STORAGE MEDIUM FOR GENERATING ADVICE FOR CAPTURING AN IMAGE

(75) Inventors: Kazuki Aisaka, Kanagawa (JP);
Masatoshi Yokokawa, Kanagawa (JP);
Jun Murayama, Tokyo (JP)

(73) Assignee: Sony Corporation, Tokyo (JP)

( * ) Notice: Subject to any disclaimer, the term of this patent is extended or adjusted under 35 U.S.C. 154(b) by 261 days.

(21) Appl. No.: 12/833,501

(22) Filed: Jul. 9, 2010

(65) Prior Publication Data

US 2011/0013039 A1    Jan. 20, 2011

(30) Foreign Application Priority Data

Jul. 17, 2009  (JP) ................ P2009-168500

(51) Int. Cl.
*H04N 5/228* (2006.01)

(52) U.S. Cl.
USPC ....................... 348/222.1; 382/173

(58) Field of Classification Search
None
See application file for complete search history.

(56) References Cited

U.S. PATENT DOCUMENTS

| | | | | |
|---|---|---|---|---|
| 6,246,837 B1* | 6/2001 | Kageyama et al. | ............ | 396/287 |
| 6,301,440 B1* | 10/2001 | Bolle et al. | ............ | 396/128 |
| 6,606,117 B1* | 8/2003 | Windle | ............ | 348/239 |
| 6,608,650 B1* | 8/2003 | Torres et al. | ............ | 348/333.02 |
| 7,317,485 B1* | 1/2008 | Miyake et al. | ............ | 348/333.02 |
| 2002/0145106 A1* | 10/2002 | Chen et al. | ............ | 250/208.1 |
| 2003/0151674 A1* | 8/2003 | Lin | ............ | 348/222.1 |
| 2003/0169350 A1* | 9/2003 | Wiezel et al. | ............ | 348/239 |
| 2004/0252217 A1* | 12/2004 | Battles et al. | ............ | 348/333.01 |
| 2005/0030388 A1* | 2/2005 | Stavely et al. | ............ | 348/222.1 |
| 2006/0017815 A1* | 1/2006 | Stavely et al. | ............ | 348/208.7 |
| 2006/0239674 A1 | 10/2006 | Manson et al. | | |
| 2007/0076960 A1* | 4/2007 | Takamori et al. | ............ | 382/224 |
| 2008/0056706 A1* | 3/2008 | Battles et al. | ............ | 396/287 |
| 2008/0079811 A1* | 4/2008 | Park et al. | ............ | 348/175 |
| 2009/0141932 A1* | 6/2009 | Jones et al. | ............ | 382/100 |

FOREIGN PATENT DOCUMENTS

| | | |
|---|---|---|
| EP | 1 748 378 | 1/2007 |
| EP | 1 770 638 A2 | 4/2007 |
| JP | HEI 11-164236 | 6/1999 |
| JP | 2005-072694 | 3/2003 |
| JP | 2003-219218 | 7/2003 |

(Continued)

OTHER PUBLICATIONS

Ke et al., "The Design of High Level Features for Photo Quality Assessment", Carnegie Mellon and Microsoft Research Asia, 2006.*

(Continued)

*Primary Examiner* — Lin Ye
*Assistant Examiner* — Dennis Hogue
(74) *Attorney, Agent, or Firm* — Finnegan, Henderson, Farabow, Garrett & Dunner, L.L.P.

(57) ABSTRACT

An apparatus for improving the quality of a captured image may include a first computing unit, a second computing unit, and an advice generating unit. The first computing unit may be configured to compute a first value representing a first aspect of the quality of a first image. The second computing unit may be configured to compute a second value representing a second aspect of the quality of the first image. The advice generating unit may be configured to generate advice for capturing a second image based on at least one of the first and second computed values.

20 Claims, 25 Drawing Sheets

(56) References Cited

FOREIGN PATENT DOCUMENTS

| | | |
|---|---|---|
| JP | 2005-003852 | 1/2005 |
| JP | 2005-269562 | 9/2005 |
| JP | 2006-222690 | 8/2006 |
| JP | 2006-253761 | 9/2006 |
| JP | 2007-081772 | 3/2007 |
| JP | 2007-097090 | 4/2007 |
| JP | 2007-251993 | 9/2007 |
| JP | 2008-066886 | 3/2008 |
| WO | WO 2005/065283 | 7/2005 |
| WO | WO 2006/068312 | 6/2006 |
| WO | WO 2009/012364 A1 | 1/2009 |

OTHER PUBLICATIONS

European Search Report for European Application No. 10169265, mailed Sep. 23, 2010, 7 pages.

Nonaka et al., "iAgent", an Image Recommendation/Rating Technique Enabling Automatic Selection among a Large Number of DCS Image, Fujifilm Research & Development, No. 52/2007, pp. 17-21, 2007, available at http://www.fujifilm.co.jp/rd/report/rd052/pack/Pdf/ff_rd052_004.pdf.

Ke et al., The Design of High-Level Features for Photo Quality Assessment, 2006, available at http://www.cs.cmu.edu/~yke/photoqual/cvpr06photo.pdf (8 pages).

Communication regarding European Application No. 10169265, mailed Jan. 30, 2013, 6 pages.

\* cited by examiner

FIG. 17

| BLUR LEVEL SCORE | NUMBER OF POINTS |
|---|---|
| 0.9 OR HIGHER | 0 |
| 0.7 OR HIGHER | 5 |
| 0.5 OR HIGHER | 7 |
| 0.3 OR HIGHER | 8 |
| 0.2 OR HIGHER | 9 |
| LOWER THAN 0.2 | 10 |

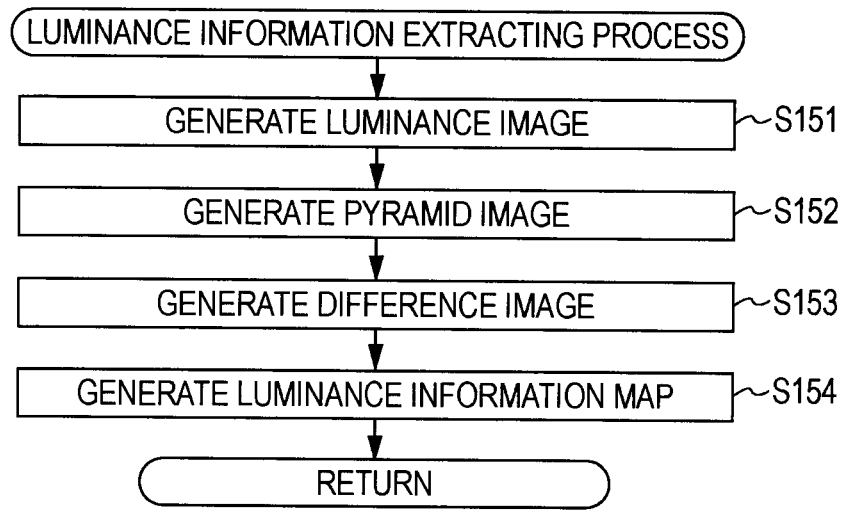
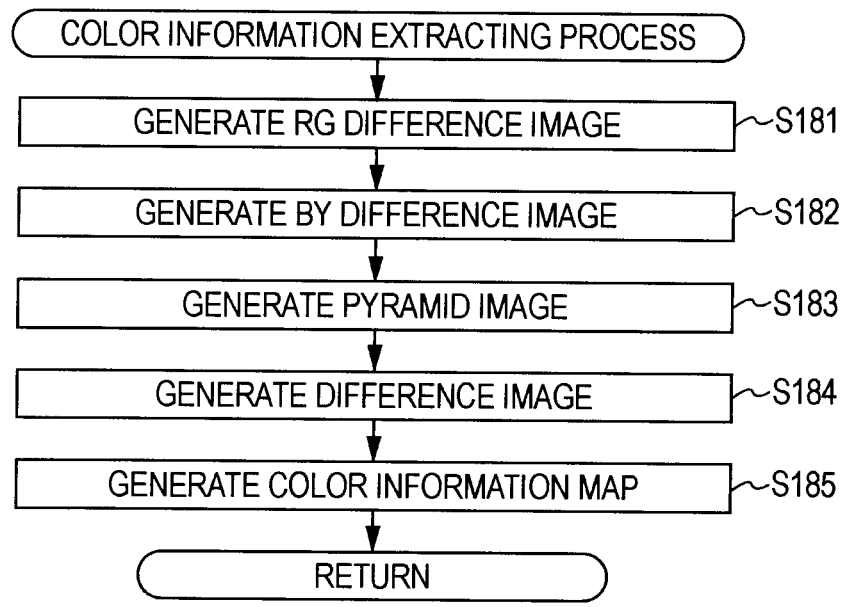

APPARATUS, CAMERA, METHOD, AND COMPUTER-READABLE STORAGE MEDIUM FOR GENERATING ADVICE FOR CAPTURING AN IMAGE

CROSS-REFERENCE TO RELATED APPLICATION

This application claims priority of Japanese Patent Application No. 2009-168500, filed on Jul. 17, 2009, the entire content of which is hereby incorporated by reference.

BACKGROUND

1. Technical Field

The present disclosure relates to an image processing apparatus, an image processing method, and a program and, in particular, to an image processing apparatus, an image processing method, and a program that allow a user to capture a highly attractive image.

2. Description of the Related Art

In order for a user to capture a highly attractive image, image pickup apparatuses that give advice to a user when the user captures an image have been developed.

Some of such image pickup apparatuses detect the position of a face image of a person in an image to be captured and output a voice message indicating an appropriate direction of the image pickup apparatus so that the detected face image is located at a predetermined position in the image to be captured (refer to, for example, Japanese Unexamined Patent Application Publication No. 2005-269562).

In addition, some of such image pickup apparatuses detects an amount of shift of a composition of an image to be captured from a preliminary image that is pre-captured in response to a user instruction and displays a sub-image indicating a direction in which the image pickup apparatus should be moved in accordance with the detection result (refer to, for example, Japanese Unexamined Patent Application Publication No. 2006-222690). If the user turns the image pickup apparatus so that it faces in the direction indicated by the sub-image, the user can capture an image having a composition that is the same as that of the preliminary image.

SUMMARY

However, in the above-described techniques, it is difficult to give an appropriate advice to the user in order for the user to capture a highly attractive image.

For example, image pickup apparatuses that output a voice message indicating an appropriate direction of the image pickup apparatus using the position of a face image of a person are unable to give advice to the user if the subject is not a person. In addition, only images having a predetermined composition can be captured using the image pickup apparatuses.

Furthermore, image pickup apparatuses that detect an amount of shift of the composition of an image to be captured from that of a preliminary image can reconstruct the composition that is the same as the composition of the preliminary image. However, since the preliminary image is captured by the user, the preliminary image may not be a widely praised image, that is, a highly attractive image. Accordingly, even when the user captures an image while following advice given by the image pickup apparatus, an attractive image is not necessarily captured.

Accordingly, there is disclosed an apparatus for improving the quality of a captured image. The apparatus may include a first computing unit, which may be configured to compute a first value representing a first aspect of the quality of a first image. The apparatus may also include a second computing unit, which may be configured to compute a second value representing a second aspect of the quality of the first image. Additionally, the apparatus may include an advice generating unit, which may be configured to generate advice for capturing a second image based on at least one of the first and second computed values.

BRIEF DESCRIPTION OF THE DRAWINGS

FIG. 17 illustrates an exemplary blur level score conversion table;

FIG. 21 is a flowchart of an exemplary luminance information extracting process;

FIG. 22 is a flowchart of an exemplary color information extracting process;

DETAILED DESCRIPTION

Exemplary embodiments of the present invention are described below with reference to the accompanying drawings.

Configuration of Image Processing Apparatus

Figure 1:
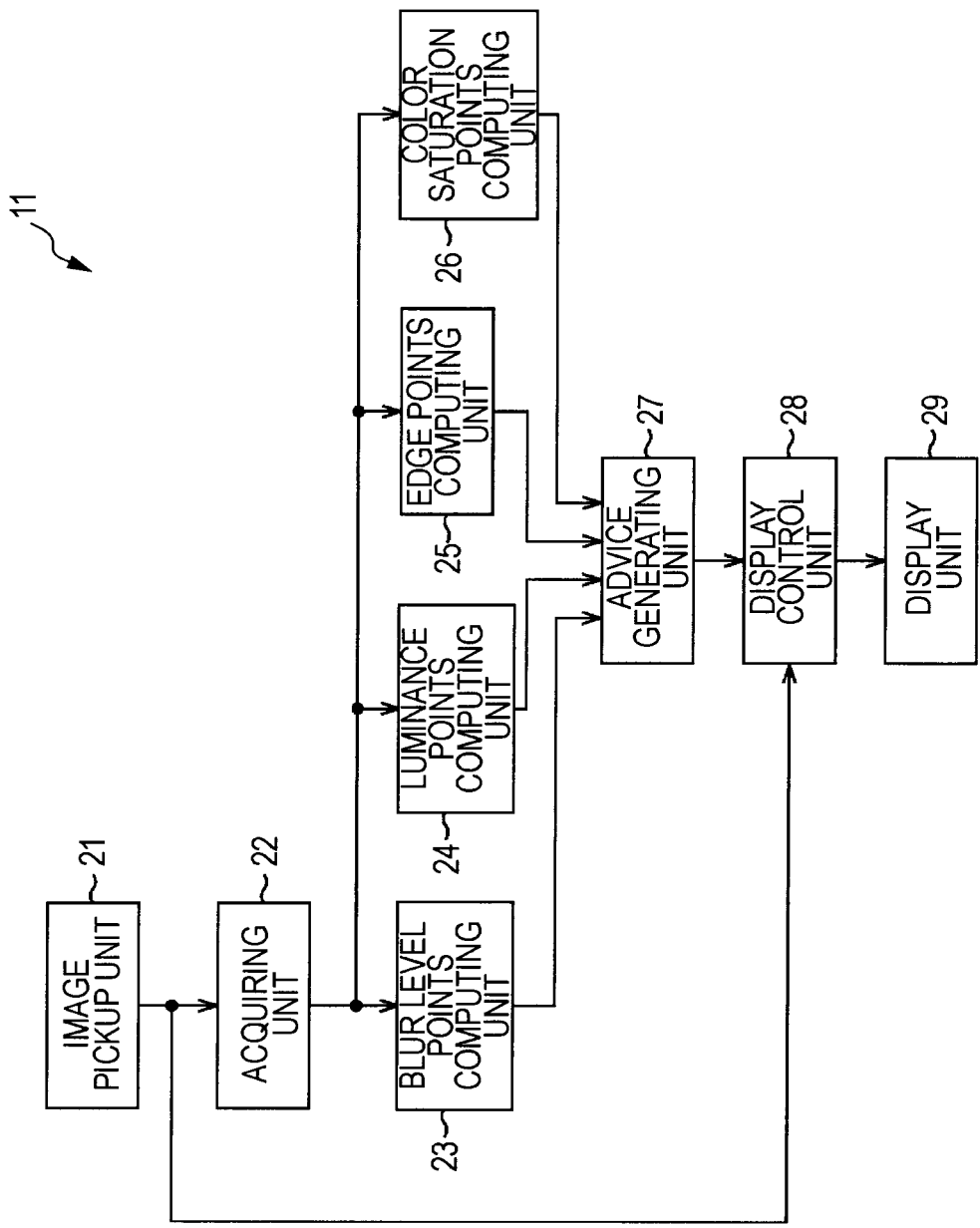
FIG. 1 illustrates an exemplary configuration of an image processing apparatus according to an embodiment of the present invention.

FIG. 1 illustrates an exemplary configuration of an image processing apparatus according to an embodiment of the present invention.

An example of an image processing apparatus 11 shown in FIG. 1 is an image pickup apparatus, such as a camera. The image processing apparatus 11 computes a value (e.g., a number of points) indicating whether an input image is attractively captured, that is, the evaluation level of the input captured image. Subsequently, in order to obtain a highly attractive input image, the image processing apparatus 11 displays an advice message on the basis of the computed number of points for the input image.

In evaluating an input image, as the input image is more similar to an image captured by a professional photographer, the input image receives a higher evaluation and, therefore, has a higher number of points. That is, an input image having a higher number of points indicates a better captured image. In addition, the number of points of the input image is computed for each of features extracted from the input image, that is, each of the evaluation indicators.

The image processing apparatus 11 includes an image pickup unit 21, an acquiring unit 22, a blur level points computing unit 23, a luminance points computing unit 24, an edge points computing unit 25, a color saturation points computing unit 26, an advice generating unit 27, a display control unit 28, and a display unit 29.

The image pickup unit 21 includes, for example, an image sensor. In response to the operation performed by a user, the image pickup unit 21 captures an input image and supplies the captured input image to the acquiring unit 22 and the display control unit 28. For example, the input image is a moving image, and each pixel of the input image has values of R (red), G (green), and B (blue) components in the form of pixel values.

The acquiring unit 22 captures an input image for one frame supplied from the image pickup unit 21. Thereafter, the acquiring unit 22 supplies the acquired input image (the still image) to the blur level points computing unit 23, the luminance points computing unit 24, the edge points computing unit 25, and the color saturation points computing unit 26. In addition, in response to an operation performed by the user, the acquiring unit 22 supplies the captured input image to a recording unit (not shown) in the form of a captured still image. Thus, the captured input image is recorded by the recording unit.

The units from the blur level points computing unit 23 to the color saturation points computing unit 26 extract predetermined types of features from the input image supplied from the acquiring unit 22 and compute a number of points indicating the quality (e.g., the attractiveness) of the input image for each of the extracted features. Thus, each of the units from the blur level points computing unit 23 to the color saturation points computing unit 26 is configured to compute a value representing one aspect of the quality of the input image.

That is, the blur level points computing unit 23 extracts, from the input image, the edge strength, which is one of the predetermined features, and computes, on the basis of the edge strength, a number of points for a blur level, which is an indicator of a blur level (blurriness) of the input image. The luminance points computing unit 24 extracts, from the input image, the luminance value, which is one of the predetermined features, and computes a number of points for luminance using the luminance value. The number of points for luminance indicates an evaluation level calculated on the basis of a distribution of luminance levels in a subject portion (a foreground portion) of the input image.

The edge points computing unit 25 extracts, from the input image, the edge strength, which is one of the predetermined features, and computes, using the edge strength, a number of points for an edge, which indicates an evaluation level of background complexity calculated on the basis of the complexity of the edge in the background portion of the input image. The color saturation points computing unit 26 extracts, from the input image, the color saturation, which is one of the predetermined features, and computes, using the color saturation, a number of points for color saturation, which indicates an evaluation level calculated on the basis of the average and the variance of the distribution of color saturation in the input image.

The units from the blur level points computing unit 23 to the color saturation points computing unit 26 supply the computed numbers of points for the blur level, luminance, edge, and color saturation to the advice generating unit 27. Note that hereinafter, when distinction among the numbers of points for the blur level, luminance, edge, and color saturation is not necessary, the numbers of points are referred to as "numbers of points for features".

In order to allow the user to capture a highly attractive image, the advice generating unit 27 generates an advice message using the numbers of points for the individual features received from the units from the blur level points computing unit 23 to the color saturation points computing unit 26. Thereafter, the advice generating unit 27 supplies the advice message to the display control unit 28. For example, the advice message is in the form of text data. A predetermined text advice message is prepared for each of the features extracted from the input image (each of the numbers of points for features).

The display control unit 28 supplies, to the display unit 29, the input image supplied from the image pickup unit 21. Thus, the input image is displayed. In addition, the display control unit 28 supplies, to the display unit 29, the advice message supplied from the advice generating unit 27. Thus, the advice message is displayed on the display unit 29. The display unit 29 includes, for example, a liquid crystal display. Under the control of the display control unit 28, the display unit 29 displays the input image and the advice message.

The input image displayed on the display unit 29 is a preview image captured by the image processing apparatus 11. While viewing the input image displayed on the display unit 29, the user moves the image processing apparatus 11 and changes the angle of the image processing apparatus 11 relative to the subject. Thus, the user can determine the composition.

After determining the composition, the user operates the image processing apparatus 11 in order to instruct the image processing apparatus 11 to capture the image. The acquiring unit 22 then captures the frame of the input image when image capturing is instructed and records the frame as the captured input image.

At that time, if the user changes the composition of the input image or controls the white balance by operating the image processing apparatus 11 in accordance with the advice displayed on the display unit 29 and instructs the image processing apparatus 11 to capture the image, a further attractive input image can be obtained.

Configuration of Blur Level Points Computing Unit

Figure 2:
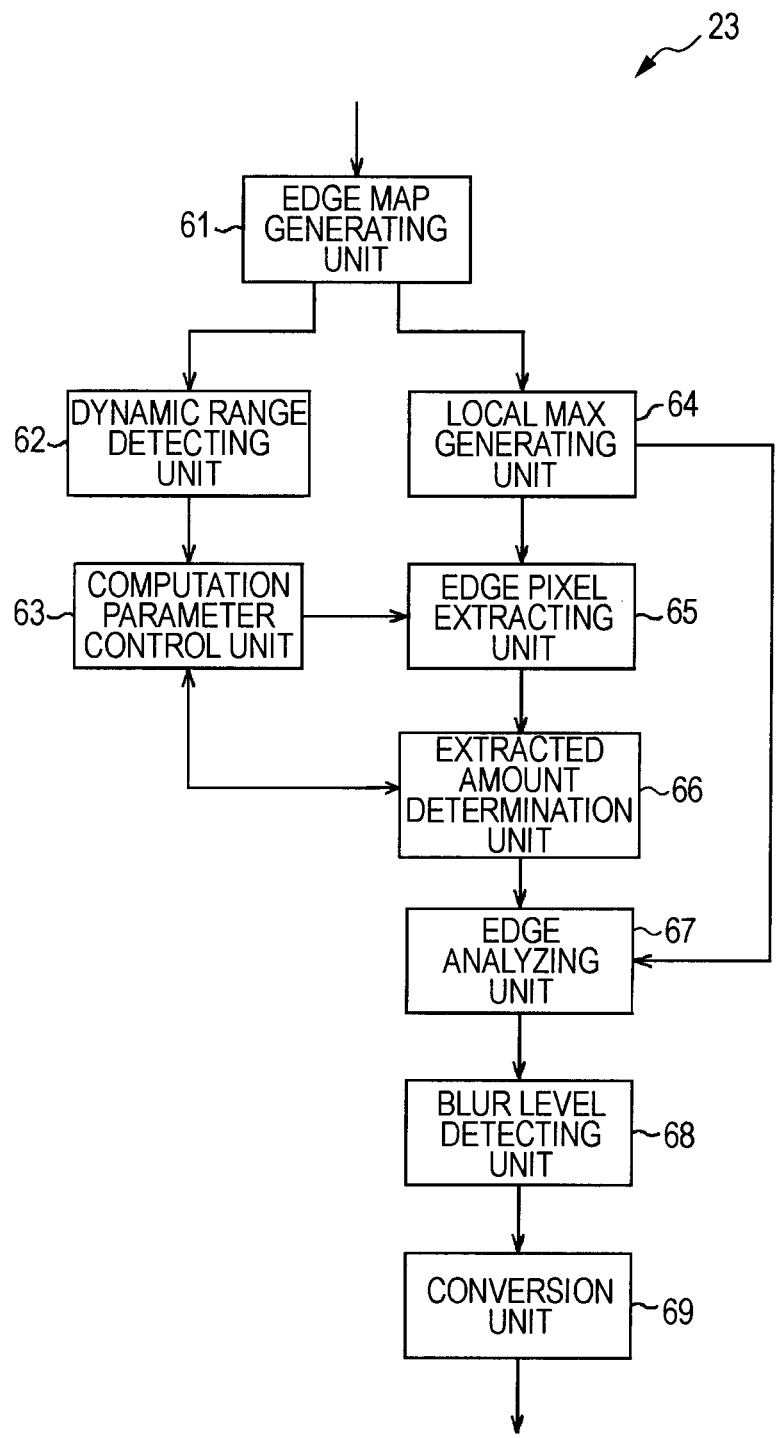
FIG. 2 illustrates an exemplary configuration of a blur level points computing unit.

The blur level points computing unit 23 shown in FIG. 1 has a configuration as illustrated in FIG. 2 in detail.

That is, the blur level points computing unit 23 includes an edge map generating unit 61, a dynamic range detecting unit 62, a computation parameter control unit 63, a local max generating unit 64, an edge pixel extracting unit 65, an extracted amount determination unit 66, an edge analyzing unit 67, a blur level detecting unit 68, and a conversion unit 69.

The edge map generating unit 61 detects the strength of the edge (the edge strength) of the input image supplied from the acquiring unit 22 on a per block basis for each of blocks having different sizes. Thereafter, the edge map generating unit 61 generates an edge map including the pixel values indicating the detected edge strengths. The edge map is generated for each of the block sizes. Thus, edge maps with scales SC1 to SC3 are generated in increasing order of a block size. The edge map generating unit 61 supplies the three generated edge maps to the dynamic range detecting unit 62 and the local max generating unit 64.

The dynamic range detecting unit 62 detects a dynamic range defined as a difference between the maximum value and the minimum value of the edge strength of the input image using the edge maps supplied from the edge map generating unit 61. Thereafter, the dynamic range detecting unit 62 supplies the results of detection to the computation parameter control unit 63.

The computation parameter control unit 63 controls, using the results of detection supplied from the dynamic range detecting unit 62, a computation parameter used for extracting edge pixels so that the number of extracted edge pixels becomes an appropriate value. The number of extracted edge pixels is used for detecting the blur level of the input image (hereinafter also referred to as an "extracted edge pixel number"). As used herein, the term "edge pixel" refers to a pixel that constitutes an edge in the image.

In addition, the computation parameters include an edge reference value used for determining whether a pixel is an edge pixel and an extraction reference value used for determining whether the number of the extracted edge pixels is appropriate. The computation parameter control unit 63 supplies the edge reference value to the edge pixel extracting unit 65 and the extracted amount determination unit 66 and supplies the extraction reference value to the extracted amount determination unit 66.

The local max generating unit 64 separates the edge map supplied from the edge map generating unit 61 into blocks each having a predetermined size. Thereafter, the local max generating unit 64 extracts the maximum pixel value of each of the blocks and generates a local max. A local max is generated for each of the scales of the edge map. The local max generating unit 64 supplies the local maxes to the edge pixel extracting unit 65 and the edge analyzing unit 67. Hereinafter, the local maxes generated from the edge maps with the scales SC1 to SC3 are referred to as "local maxes LM1 to LM3", respectively.

The edge pixel extracting unit 65 extracts edge pixels from the input image using the edge reference value supplied from the computation parameter control unit 63 and the local maxes supplied from the local max generating unit 64. In addition, the edge pixel extracting unit 65 generates an edge pixel table indicating information regarding the extracted edge pixels and supplies the generated edge pixel table to the extracted amount determination unit 66. Hereinafter, the edge pixel tables generated from the local maxes LM1 to LM3 are referred to as "edge pixel tables ET1 to ET3", respectively.

The extracted amount determination unit 66 determines whether the extracted edge pixel number is appropriate using the edge pixel tables supplied from the edge pixel extracting unit 65 and the extraction reference value supplied from the computation parameter control unit 63. If the extracted edge pixel number is not appropriate, the extracted amount determination unit 66 sends a message indicating that the extracted edge pixel number is not appropriate to the computation parameter control unit 63. However, if the extracted edge pixel number is appropriate, the extracted amount determination unit 66 supplies the current edge reference value and the edge pixel table to the edge analyzing unit 67.

The edge analyzing unit 67 analyzes the edge pixels of the input image on the basis of the edge pixel table supplied from the extracted amount determination unit 66. Thereafter, the edge analyzing unit 67 supplies the results of the analysis to the blur level detecting unit 68. The blur level detecting unit 68 detects the blur level, which is the index of the blur of the input image, and converts the blur level into a blur level score. Thereafter, the blur level detecting unit 68 supplies the blur level score to the conversion unit 69. Note that the blur level score indicates the blur level of the input image. As the score increases, the input image is more blurred overall.

The conversion unit 69 converts the blur level score supplied from the blur level detecting unit 68 into the number of points for a blur level using a prestored conversion table and supplies the number of points for a blur level to the advice generating unit 27. As used herein, the term "number of points for a blur level" refers to an evaluation value of the attractiveness of the input image using the blur level as an index. As the amount of blur of the input image increases, the number of points for a blur level decreases.

Configuration of Luminance Score Computing Unit

Figure 3:
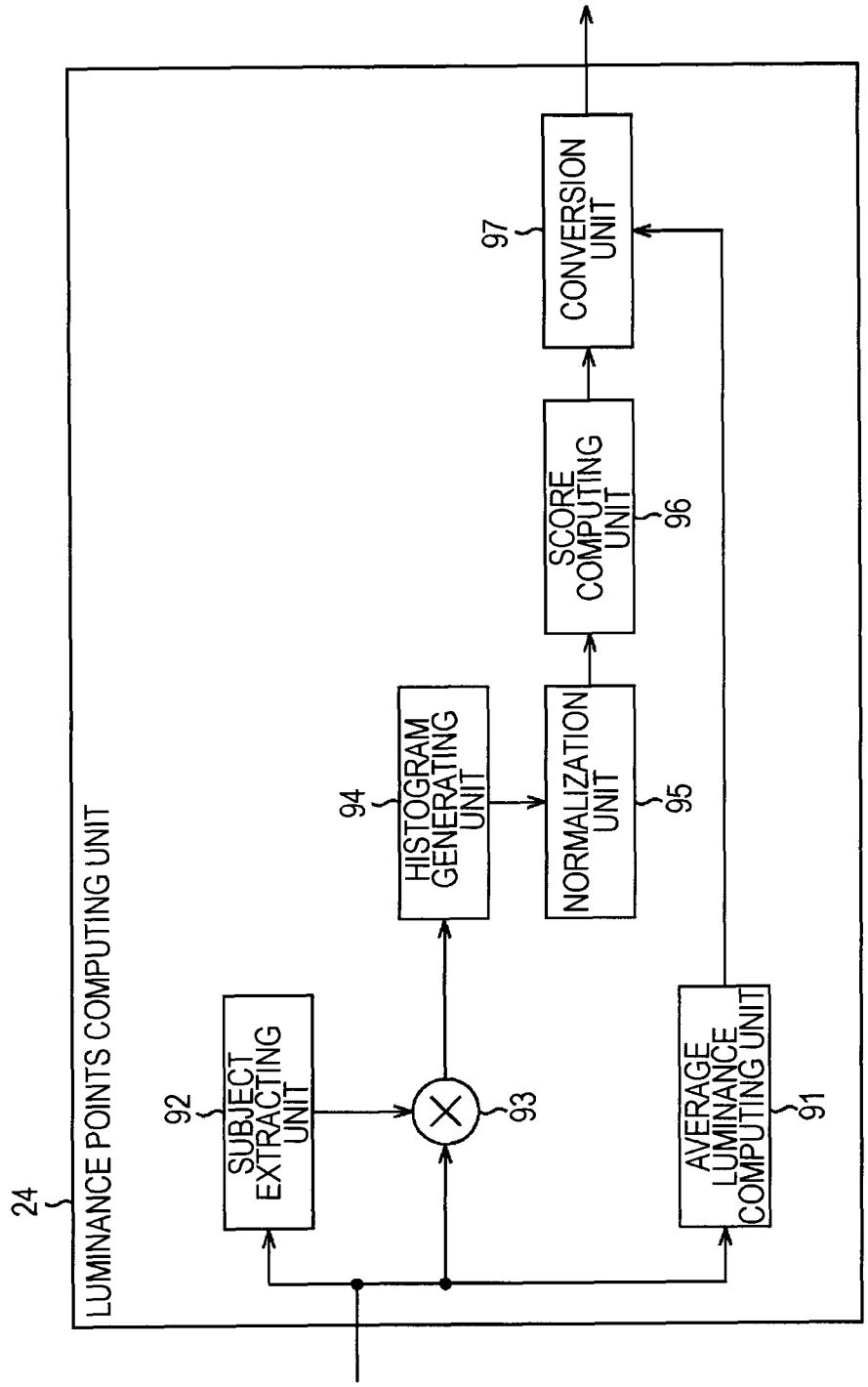
FIG. 3 illustrates an exemplary configuration of a luminance points computing unit.

The luminance points computing unit 24 shown in FIG. 1 has a configuration as illustrated in FIG. 3 in detail.

That is, the luminance points computing unit 24 includes an average luminance computing unit 91, a subject extracting unit 92, a multiplier unit 93, a histogram generating unit 94, a normalization unit 95, a score computing unit 96, and a conversion unit 97. The input image supplied from the acquiring unit 22 is supplied to the average luminance computing unit 91, the subject extracting unit 92, and the multiplier unit 93.

Using the input image supplied from the acquiring unit 22, the average luminance computing unit 91 computes the average luminance which is an average value of luminance values of the pixels of the input image and supplies the average luminance to the conversion unit 97.

The subject extracting unit 92 separates a foreground portion of the input image from a background portion of the input image. For example, the subject extracting unit 92 generates a subject map used for extracting a region of the input image that includes the subject using the input image supplied from the acquiring unit 22 and supplies the generated subject map to the multiplier unit 93.

For example, the pixel value of a pixel of the subject map is set to "1" if a pixel of the input image located at the same position as that of the pixel of the subject map is included in the region of the subject. However, the pixel value of a pixel of the subject map is set to "0" if a pixel of the input image located at the same position as that of the pixel of the subject map is not included in the region of the subject. As used herein, the term "subject" refers to an object in the input image that seems to draw the attention of the user when the user glances at the input image. Accordingly, the subject is not necessarily a person.

The multiplier unit 93 multiplies the pixel value of each of the pixels of the input image supplied from the acquiring unit 22 by the pixel value of a corresponding pixel of the subject map supplied from the subject extracting unit 92. Thus, the multiplier unit 93 generates a subject image, which is an image of the region of the subject in the input image, and supplies the generated subject image to the histogram generating unit 94. In the subject image, the pixel value of a pixel of the subject is the same as the pixel value of the pixel of the input image located at the same position, and the pixel value of a pixel of the background image that does not include the subject is set to "0". That is, through the multiplication process performed by the multiplier unit 93, the region of the subject in the input image is identified (extracted), and the subject image including only the subject is generated.

The histogram generating unit 94 generates, using the subject image supplied from the multiplier unit 93, a histogram of the luminance values of the subject image and supplies the generated histogram to the normalization unit 95. The normalization unit 95 normalizes the histogram supplied from the histogram generating unit 94 and supplies the normalized histogram to the score computing unit 96.

The score computing unit 96 computes a luminance score using the histogram supplied from the normalization unit 95 and supplies the luminance score to the conversion unit 97. The luminance score indicates a similarity of the luminance distribution of the foreground portion of the input image to the luminance distribution of the foreground portion of a previously prepared attractive image.

The conversion unit 97 converts the luminance score supplied from the score computing unit 96 into a number of points for luminance using a prestored conversion table. The number of points for luminance obtained through the conversion indicates the attractiveness of the input image using the luminance distribution of the foreground of the input image as an indicator. In addition, the conversion unit 97 supplies the number of points for luminance obtained through the conversion and the average luminance supplied from the average luminance computing unit 91 to the advice generating unit 27.

Configuration of Subject Extracting Unit

Figure 4:
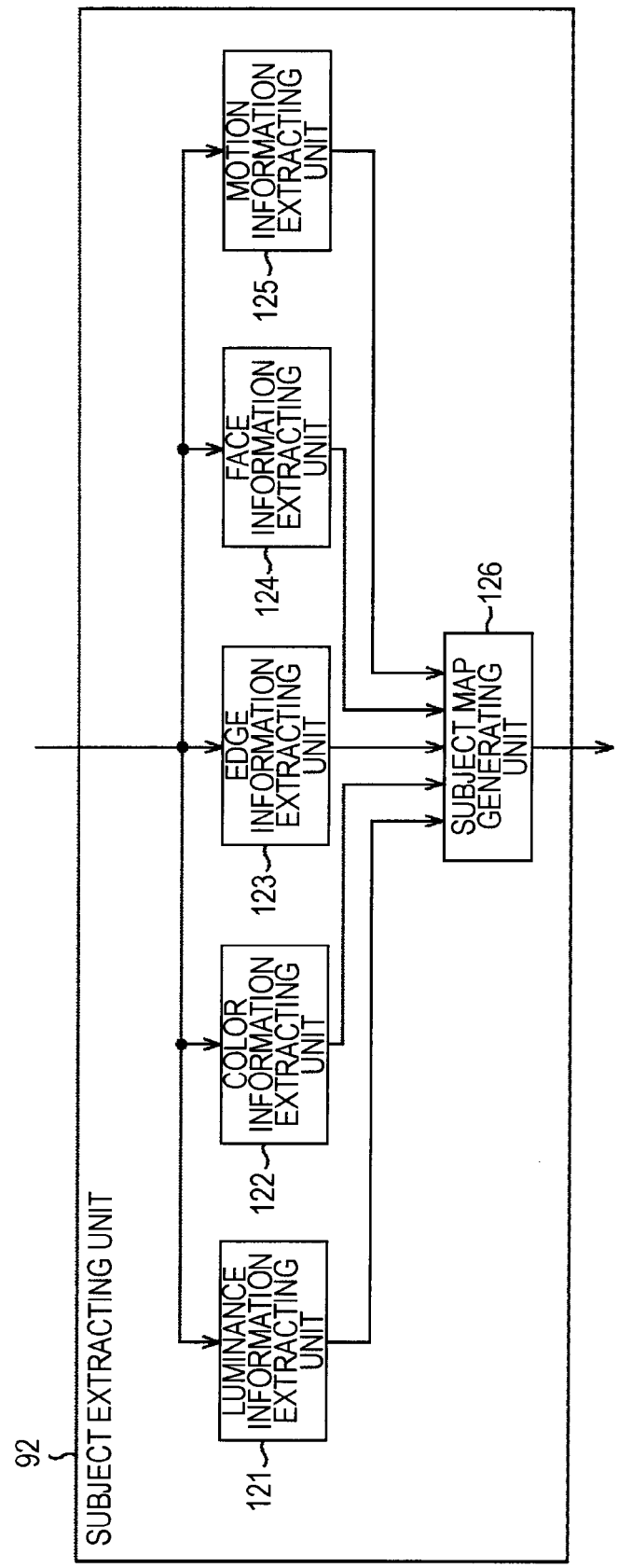
FIG. 4 illustrates an exemplary configuration of a subject extracting unit.

The subject extracting unit 92 shown in FIG. 3 has a configuration as illustrated in FIG. 4 in detail.

That is, the subject extracting unit 92 includes a luminance information extracting unit 121, a color information extracting unit 122, an edge information extracting unit 123, a face information extracting unit 124, a motion information extracting unit 125, and a subject map generating unit 126. In addition, the input image supplied from the acquiring unit 22 is supplied to the units from the luminance information extracting unit 121 to the motion information extracting unit 125 of the subject extracting unit 92.

The units from the luminance information extracting unit 121 to the motion information extracting unit 125 extract, from the input image supplied from the acquiring unit 22, features that the subject region has to a greater degree than the non-subject region. Thereafter, the units generate an information map indicating the likelihood of each of the regions of the input image being a subject region.

More specifically, the luminance information extracting unit 121 extracts the luminance values from the input image and generates a luminance information map indicating the information regarding luminance for each of the regions of the input image. Thereafter, the luminance information extracting unit 121 supplies the generated luminance map to the subject map generating unit 126. The color information extracting unit 122 extracts predetermined color components from the input image and generates a color information map indicating the information regarding colors for each of the regions of the input image. Thereafter, the color information extracting unit 122 supplies the generated color information map to the subject map generating unit 126.

The edge information extracting unit 123 extracts the edge strength from the input image and generates an edge information map indicating the information regarding edges for each of the regions of the input image. Thereafter, the edge information extracting unit 123 supplies the generated edge information map to the subject map generating unit 126. The face information extracting unit 124 extracts the feature of a human face from the input image and generates a face information map indicating the information regarding a human face serving as a subject for each of the regions of the input image. Thereafter, the face information extracting unit 124 supplies the generated face information map to the subject map generating unit 126. The motion information extracting unit 125 extracts a motion vector from the input image and generates a motion information map indicating the motion for each of the regions of the input image. Thereafter, the motion information extracting unit 125 supplies the generated motion information map to the subject map generating unit 126.

Note that hereinafter, when distinction among the luminance information map, the color information map, the edge information map, the face information map, and the motion information map output from the luminance information extracting unit 121 to the motion information extracting unit 125 is not necessary, the maps are simply referred to as "information maps". The information contained in the information map indicates information that is contained to a greater degree in a region including a subject than in a region not including the subject. That information for each of the regions is arranged so as to correspond to a region and forms an information map. That is, the information map contains information indicating the features of the individual regions of the input image.

Accordingly, a region containing the amount of information more than another region in each of the information maps, that is, a region of the input image corresponding to the region having a large amount of information is considered as a region that is highly likely to include a subject. Thus, by using the information maps, a region of the input image that includes the subject can be identified.

The subject map generating unit 126 linearly-combines the information maps supplied from the units from the luminance information extracting unit 121 to the motion information extracting unit 125 and generates a subject map. That is, information items (features) regarding regions of the luminance information map to the motion information map located at the same position are weighted and summed. This summing operation is repeated for the entire area of the map. Thus, the subject map is generated. The subject map generating unit 126 supplies the generated subject map to the multiplier unit 93.

Configuration of Luminance Information Extracting Unit

The configurations of the units from the luminance information extracting unit 121 to the motion information extracting unit 125 shown in FIG. 4 are described in more detail with reference to FIGS. 5 to 9.

Figure 5:
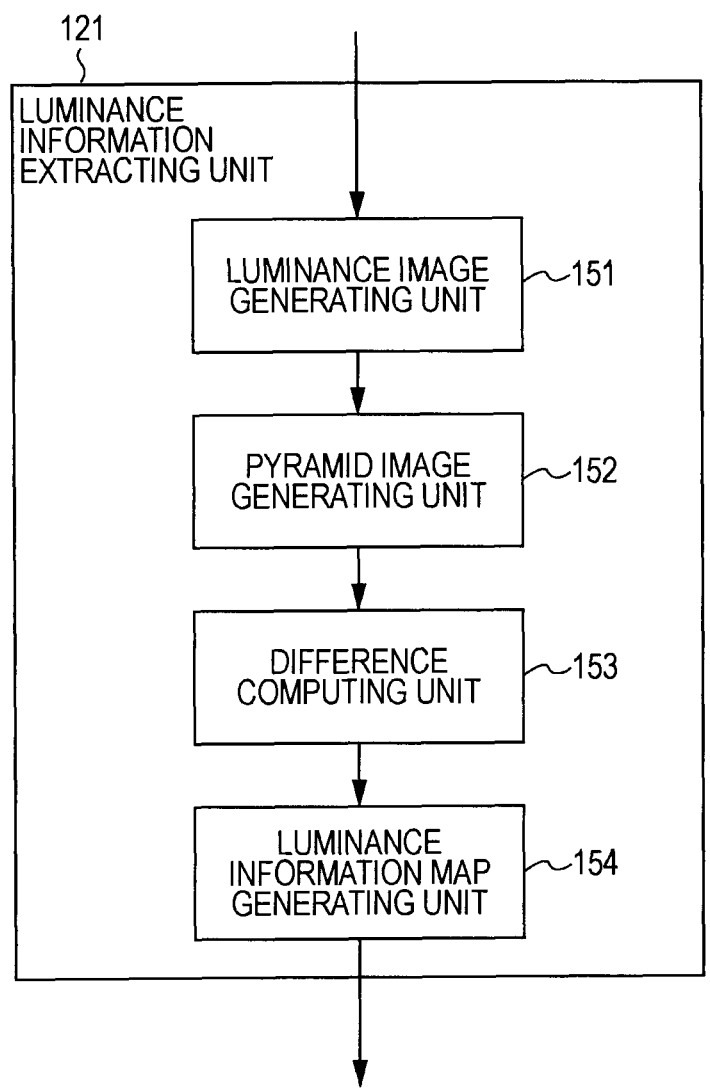
FIG. 5 illustrates an exemplary configuration of a luminance information extracting unit.

FIG. 5 illustrates an exemplary configuration of the luminance information extracting unit 121 in more detail.

The luminance information extracting unit 121 includes a luminance image generating unit 151, a pyramid image generating unit 152, a difference computing unit 153, and a luminance information map generating unit 154.

The luminance image generating unit 151 generates a luminance image using the input image supplied from the acquiring unit 22 and supplies the generated luminance image to the pyramid image generating unit 152. The luminance image includes pixels having pixel values that are the same as those of the input image. That is, the pixel value of a pixel of the luminance image at any point is the same as the luminance value of a pixel of the input image located at the same position as that point.

The pyramid image generating unit 152 generates a plurality of luminance images having different resolutions using the luminance image supplied from the luminance image generating unit 151 and supplies the generated luminance images to the difference computing unit 153 in the form of a pyramid image of the luminance images.

For example, a pyramid image having eight layers from levels L1 to L8 is generated. The pyramid image in the level L1 has the highest resolution, and the resolution of the pyramid image decreases from the level L1 to the level L8.

In this case, the luminance image generated by the luminance image generating unit 151 serves as a pyramid image in the level L1. In addition, in a pyramid image of a level Li ($1 \leq i \leq 7$), an average value of the pixel value of four neighboring pixels represents the pixel value of a pixel of a pyramid image of a level L(i+1). Accordingly, the pyramid image of the level L(i+1) has a size that is laterally and longitudinally half the size of the pyramid image of the level Li (if the size is not divisible by 2, the size is rounded down).

The difference computing unit 153 selects, from among the plurality of pyramid images supplied from the pyramid image generating unit 152, two pyramid images of different layers and computes the difference between the selected pyramid images. In this way, the difference computing unit 153 generates a difference image in terms of luminance. Note that the sizes (the number of pixels) of the pyramid images in different layers differ from each other. Accordingly, when the difference image is generated, a smaller one of the pyramid images is upconverted so that the size of the smaller one becomes the same as the size of the larger one.

After the difference computing unit 153 generates a predetermined number of difference images in terms of luminance, the difference computing unit 153 normalizes the difference images and supplies the normalized difference images to the luminance information map generating unit 154. The luminance information map generating unit 154 generates a luminance information map using the difference images supplied from the difference computing unit 153 and supplies the generated luminance information map to the subject map generating unit 126.

Configuration of Color Information Extracting Unit

Figure 6:
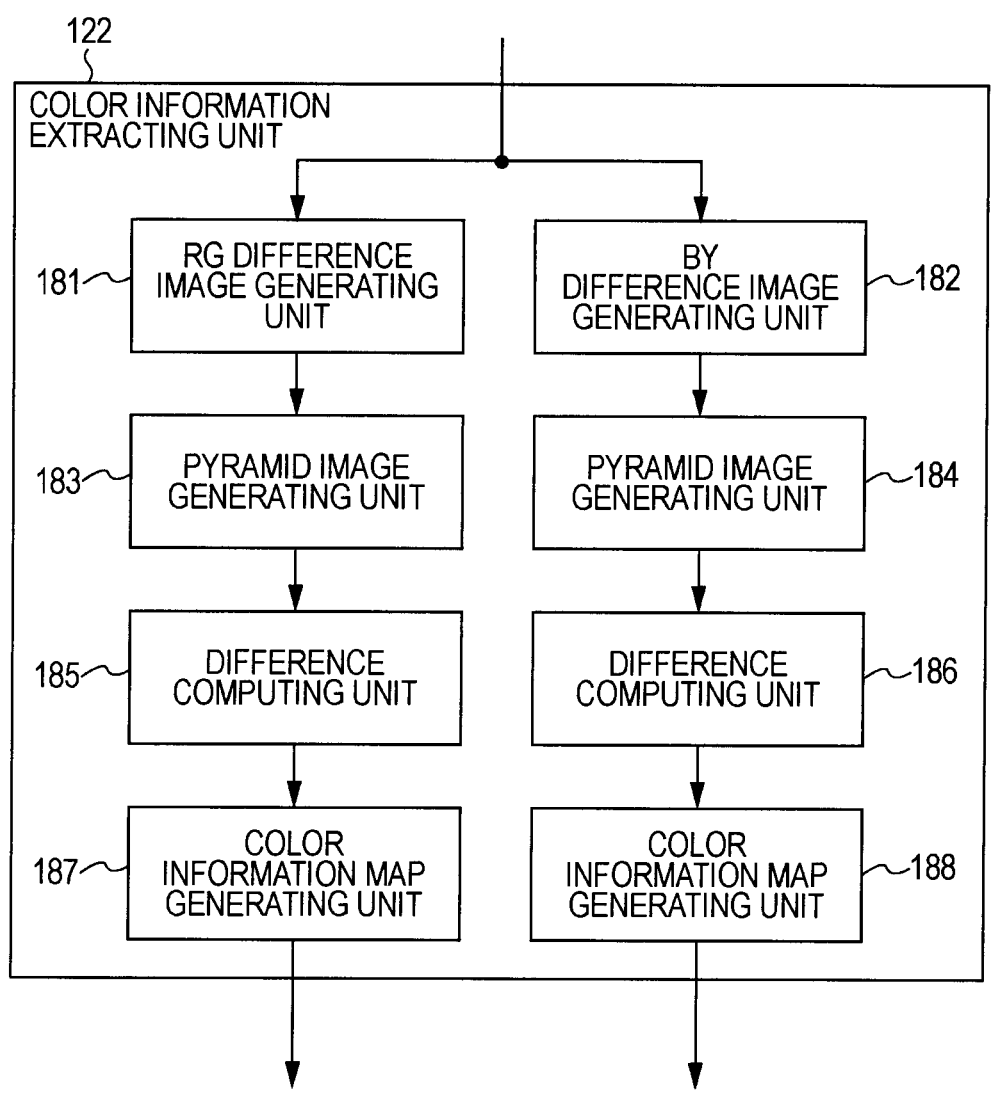
FIG. 6 illustrates an exemplary configuration of a color information extracting unit.

FIG. 6 illustrates an exemplary configuration of the color information extracting unit 122 shown in FIG. 4 in detail.

The color information extracting unit 122 includes an RG difference image generating unit 181, a BY difference image generating unit 182, a pyramid image generating unit 183, a pyramid image generating unit 184, a difference computing unit 185, a difference computing unit 186, a color information map generating unit 187, and a color information map generating unit 188.

The RG difference image generating unit 181 generates an RG difference image using the input image supplied from the acquiring unit 22 and supplies the RG difference image to the pyramid image generating unit 183. The RG difference image includes pixels having pixel values each equal to the difference between an R (red) component and a G (green) component of a corresponding pixel of the input image. That is, the pixel value of a pixel at any point of the RG difference image represents the difference between the R component and the G component of a pixel of the input image located at the same position as that point.

The BY difference image generating unit 182 generates a BY difference image using the input image supplied from the acquiring unit 22 and supplies the BY difference image to the pyramid image generating unit 184. The BY difference image includes pixels having pixel values each equal to the difference between a B (blue) component and a Y (yellow) component of a corresponding pixel of the input image. That is, the pixel value of a pixel at any point of the BY difference image represents the difference between the B component and the Y component of a pixel of the input image located at the same position as that point.

The pyramid image generating unit 183 and the pyramid image generating unit 184 generate a plurality of RG difference images having different resolutions and a plurality of BY difference images having different resolutions using the RG difference image and BY difference image supplied from the RG difference image generating unit 181 and the BY difference image generating unit 182, respectively. Thereafter, the pyramid image generating unit 183 and the pyramid image generating unit 184 supplies the generated RG difference images and BY difference images to the difference computing unit 185 and the difference computing unit 186 as pyramid images in terms of an RG difference and pyramid images in terms of a BY difference, respectively.

For example, like the pyramid images in terms of luminance, pyramid images having eight resolutions in the level L1 to the level L8 are generated in terms of an RG difference and in terms of a BY difference.

Each of the difference computing unit 185 and the difference computing unit 186 selects, from among the plurality of pyramid images supplied from the pyramid image generating unit 183 or the pyramid image generating unit 184, two pyramid images of different layers and computes the difference between the selected pyramid images. In this way, the difference computing unit 185 and the difference computing unit 186 generate a difference image in terms of an RG difference and a difference image in terms of a BY difference, respectively. Note that the sizes of the pyramid images in different layers differ from each other. Accordingly, when the difference image is generated, a smaller one of the pyramid images is upconverted so that the size of the smaller one becomes the same as the size of the larger one.

After the difference computing unit 185 and the difference computing unit 186 generate a predetermined number of difference images in terms of an RG difference and a predetermined number of difference images in terms of a BY difference, respectively, the difference computing unit 185 and the difference computing unit 186 normalize the generated difference images and supply the normalized difference images to the color information map generating unit 187 and the color information map generating unit 188. The color information map generating unit 187 and the color information map generating unit 188 generate color information maps using the difference images supplied from the difference computing unit 185 and the difference computing unit 186. Thereafter, the color information map generating unit 187 and the color information map generating unit 188 supply the color information maps to the subject map generating unit 126. In the color information map generating unit 187, a color information map in terms of an RG difference is generated. In addition, in the color information map generating unit 188, a color information map in terms of a BY difference is generated.

Configuration of Edge Information Extracting Unit

Figure 7:
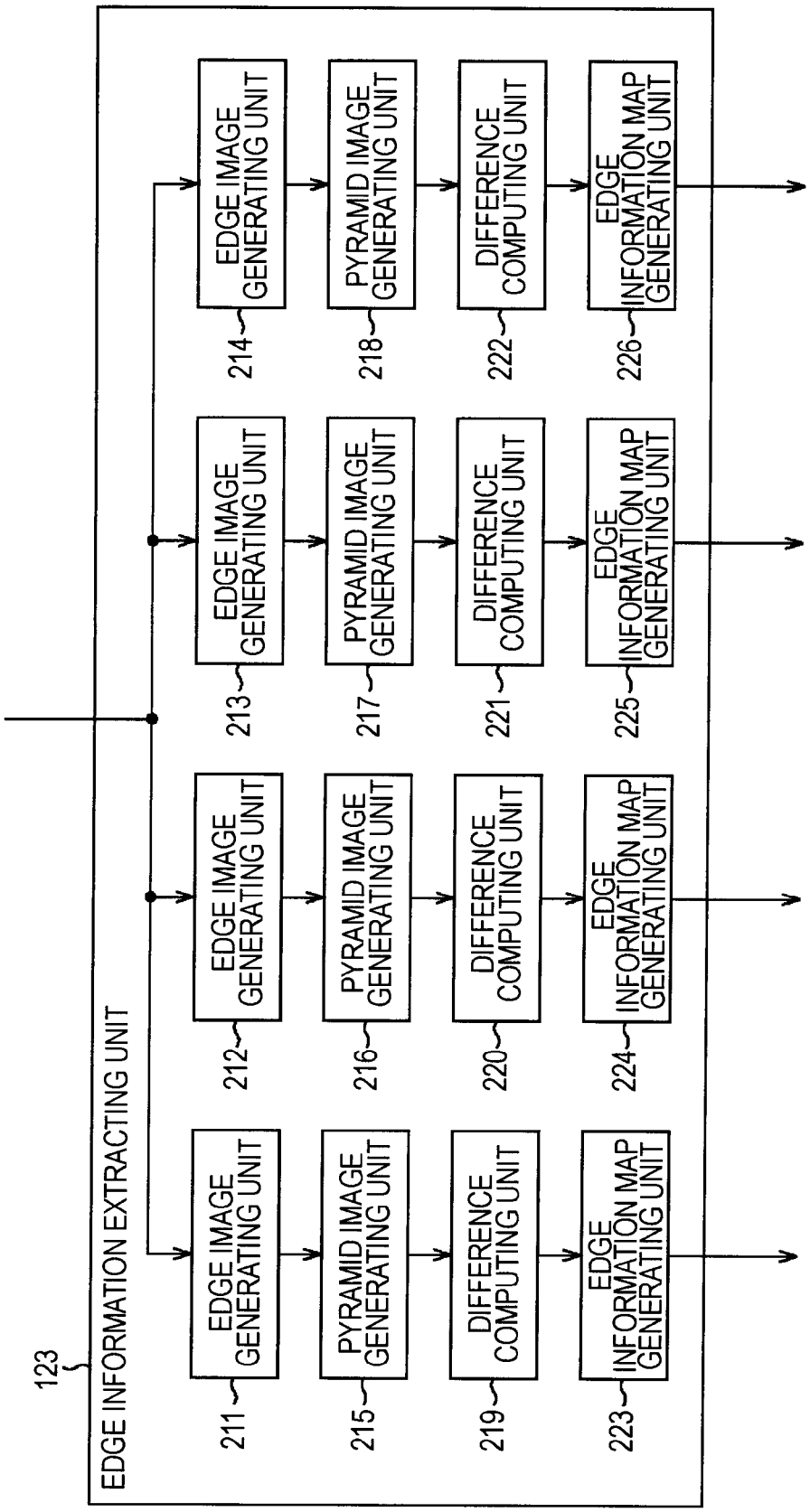
FIG. 7 illustrates an exemplary configuration of an edge information extracting unit.

FIG. 7 illustrates an exemplary configuration of the edge information extracting unit 123 shown in FIG. 4 in detail.

The edge information extracting unit 123 includes edge image generating units 211 to 214, pyramid image generating units 215 to 218, difference computing units 219 to 222, and edge information map generating units 223 to 226.

The edge image generating units 211 to 214 perform a filtering process using a Gabor Filter on the input image supplied from the acquiring unit 22. For example, the edge image generating units 211 to 214 generate edge images including pixels having pixel values representing edge strengths in directions of 0 degree, 45 degrees, 90 degrees, and 135 degrees, respectively. Thereafter, the edge image generating units 211 to 214 supply the generated edge images to the pyramid image generating units 215 to 218, respectively.

For example, the pixel value of a pixel of an edge image generated by the edge image generating unit 211 at any point represents the 0-degree direction edge strength of a pixel of the input image located at the same position as that point. As used herein, the term "edge direction" refers to a direction indicated by the angle component of a Gabor function that is used to achieve the Gabor filter.

The pyramid image generating units 215 to 218 generate a plurality of edge images having different resolutions using the edge images in the different directions supplied from the edge image generating units 211 to 214. Thereafter, the pyramid image generating units 215 to 218 supply the generated edge images for different directions to the difference computing units 219 to 222 as pyramid images for different edge directions.

For example, like the pyramid images in terms of luminance, pyramid images in the eight layers from the level L1 to the level L8 are generated as pyramid images for different edge directions.

Each of the difference computing units 219 to 222 selects, from among the plurality of pyramid images supplied from the pyramid image generating units 215 to 218, two pyramid images of different layers and computes the difference between the selected pyramid images. In this way, the difference computing units 219 to 222 generate difference images for different edge directions. Note that the sizes of the pyramid images in different layers differ from each other. Accordingly, when the difference image is generated, a smaller one of the pyramid images is upconverted.

After the difference computing units 219 to 222 generate a predetermined number of difference images for each of the different edge directions, the difference computing units 219 to 222 normalize the generated difference images and supply the normalized difference images to the edge information map generating units 223 to 226, respectively. The edge information map generating units 223 to 226 generate edge information maps for the different edge directions using the difference images supplied from the difference computing units 219 to 222, respectively. Thereafter, the edge information map generating units 223 to 226 supply the edge information maps for different directions to the subject map generating unit 126.

Configuration of Face Information Extracting Unit

Figure 8:
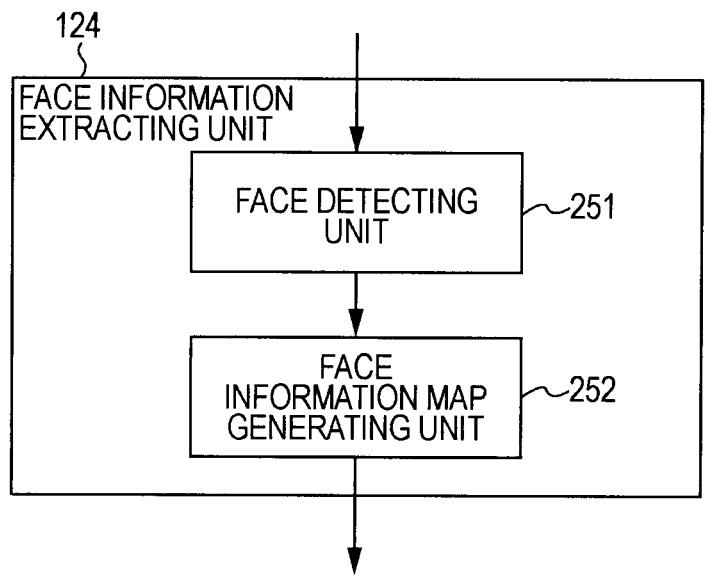
FIG. 8 illustrates an exemplary configuration of a face information extracting unit.

FIG. 8 illustrates an exemplary configuration of the face information extracting unit 124 shown in FIG. 4 in more detail.

The face information extracting unit 124 includes a face detecting unit 251 and a face information map generating unit 252.

The face detecting unit 251 detects a region of a human face from the input image supplied from the acquiring unit 22 as a subject and supplies the results of detection to the face information map generating unit 252. The face information map generating unit 252 generates a face information map on the basis of the results of detection supplied from the face detecting unit 251 and supplies the face information map to the subject map generating unit 126.

Configuration of Motion Information Extracting Unit

Figure 9:
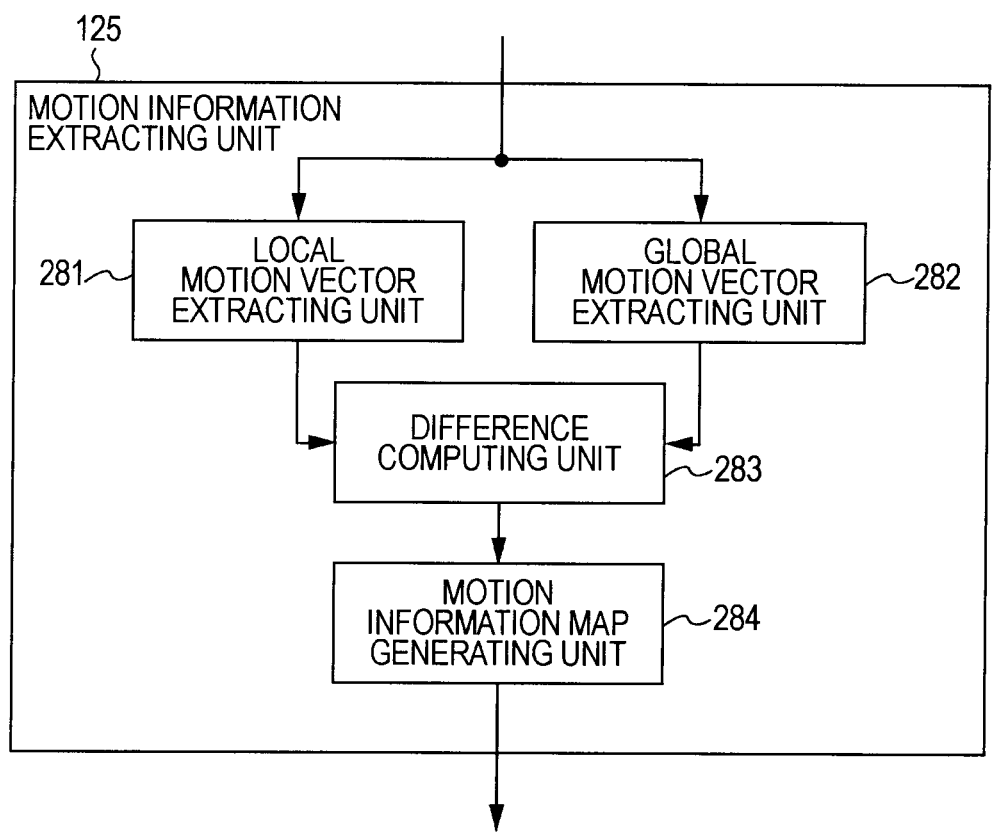
FIG. 9 illustrates an exemplary configuration of a motion information extracting unit.

FIG. 9 illustrates an exemplary configuration of the motion information extracting unit 125 shown in FIG. 4 in more detail.

The motion information extracting unit 125 includes a local motion vector extracting unit 281, a global motion vector extracting unit 282, a difference computing unit 283, and a motion information map generating unit 284.

The local motion vector extracting unit 281 detects the motion vector of each of the pixels of the input image as a local motion vector using the input image supplied from the acquiring unit 22 and another input image having an image capturing time different from that of the input image. Thereafter, the local motion vector extracting unit 281 supplies the local motion vector to the difference computing unit 283. The global motion vector extracting unit 282 detects the motion vector of each of the pixels of the input image using the input image supplied from the acquiring unit 22 and another input image having an image capturing time different from that of the input image. Thereafter, the global motion vector extracting unit 282 computes the average value of the motion vectors of the pixels as a global motion vector and supplies the global motion vector to the difference computing unit 283. The global motion vector indicates the direction of the motion of the entire input image.

The difference computing unit 283 computes an absolute value of the difference between the local motion vector supplied from the local motion vector extracting unit 281 and the global motion vector supplied from the global motion vector extracting unit 282 and generates a difference image in terms of motion. Thereafter, the difference computing unit 283 supplies the generated difference image to the motion information map generating unit 284. Note that the pixel value of a pixel of the motion difference image at any point represents an absolute value of the difference between the local motion vector of a pixel of the input image located at the same position as that point and the global motion vector of the entire input image. Accordingly, the pixel value of a pixel of the motion difference image indicates a motion of an object (or the foreground) indicated by the pixel relative to the entire input image (i.e., the background).

The motion information map generating unit 284 generates a motion information map on the basis of the motion difference image supplied from the difference computing unit 283 and supplies the generated motion information map to the subject map generating unit 126.

Configuration of Edge Points Computing Unit

Figure 10:
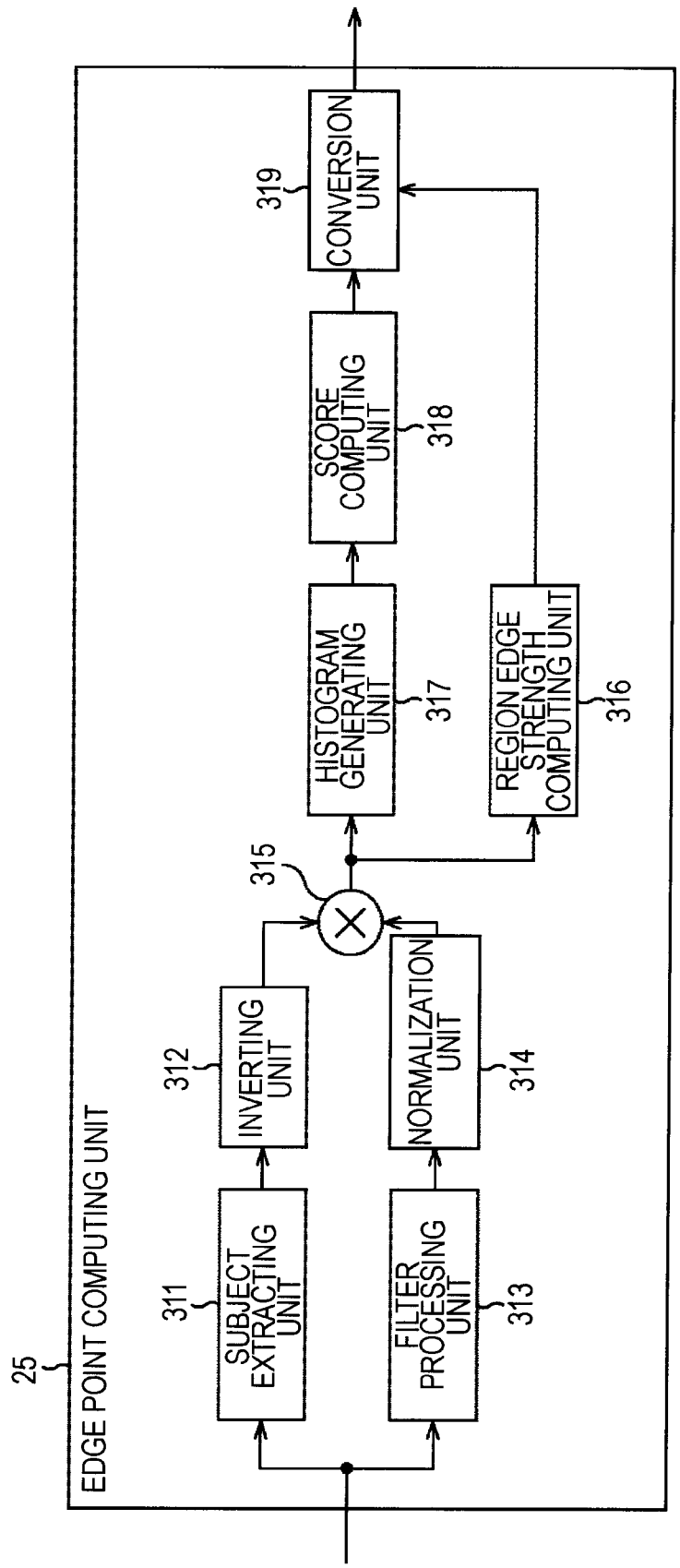
FIG. 10 illustrates an exemplary configuration of an edge points computing unit.

The edge points computing unit 25 shown in FIG. 1 has a configuration as illustrated in FIG. 10 in detail.

That is, the edge points computing unit 25 includes a subject extracting unit 311, an inverting unit 312, a filter processing unit 313, a normalization unit 314, a multiplier unit 315, a region edge strength computing unit 316, a histogram generating unit 317, a score computing unit 318, and a conversion unit 319.

The subject extracting unit 311 generates a subject map on the basis of the input image supplied from the acquiring unit 22 and supplies the generated subject map to the inverting unit 312. Note that the subject extracting unit 311 has a configuration that is similar to the configuration of the subject extracting unit 92 shown in FIG. 4 and, therefore, the description thereof is not repeated.

The inverting unit 312 inverts the pixel values of the pixels of the subject map supplied from the subject extracting unit 311 and supplies the subject map to the multiplier unit 315. That is, in the subject map, the pixel value "1" of a pixel is changed to "0", while the pixel value "0" of a pixel is changed to "1". Accordingly, after inversion, the pixel value of a pixel of the subject map is set to "0" if a region of the input image located at the same position as the pixel is estimated to include a subject. However, the pixel value of a pixel of the subject map is set to "1" if a region of the input image located at the same position of the pixel is estimated not to include the subject. That is, the inverted subject map serves as a map for identifying a background region of that does not include the subject image in the input image.

The filter processing unit 313 performs a filtering process using a Laplacian filter on the input image supplied from the acquiring unit 22 and generates a Laplacian image. The Laplacian image includes pixels having pixel values representing its edge strength in each of the regions of the input image and supplies the Laplacian image to the normalization unit 314. The normalization unit 314 normalizes the Laplacian image supplied from the filter processing unit 313 and supplies the normalized Laplacian image to the multiplier unit 315.

The multiplier unit 315 multiplies the pixel value of each of the pixels of the Laplacian image supplied from the normalization unit 314 by the pixel value of the corresponding pixel of the inverted subject map supplied from the inverting unit 312. Thus, the multiplier unit 315 generates a background image, which is an image of the edge strength of a region of the background in the input image. The multiplier unit 315 supplies the generated background image to the region edge strength computing unit 316 and the histogram generating unit 317.

In the background image, the pixel value of a pixel of the background portion that does not include the subject is the same as the pixel value of a pixel of the Laplacian image at the same location. In background image, the pixel value of the pixel of the subject is "0". That is, through the multiplication process performed by the multiplier unit 315, the region of the background is identified (extracted) from the input image. In this way, a background image including the edge strength of the background portion is generated.

The region edge strength computing unit 316 computes the region edge strength for a region in the vicinity of each outer edge of the background image supplied from the multiplier unit 315.

Hereinafter, when, for example, the input image is displayed on the display unit 29 and if the user looks at the display screen of the display unit 29 from the front, the upper end edge and the right end edge of the background image in the input image viewed by the user are simply referred to as an "upper edge" and a "right edge", respectively. In addition, two directions that are perpendicular to each other in the background image are referred to as an "x direction" and a "y direction". The end edge of the background image in the x direction is the "right edge", and the end edge of the background image in the y direction is the "upper edge". In addition, the edge of the background image in the direction opposite to the x direction is a "left edge", and the edge of the background image in the direction opposite to the y direction is the "lower edge".

In this case, the region edge strength computing unit 316 defines a region in the vicinity of the upper edge as an "upper edge region", a region in the vicinity of the lower end as a "lower end region", a region in the vicinity of the left end as a "left end region", and a region in the vicinity of the right edge as an "right edge region". The region edge strength computing unit 316 then defines the sum of the pixel values of the pixels in each of these regions as the region edge strength of the region.

For example, hereinafter, a series of pixels arranged in the x direction in the background image is referred to as an "x-direction line". Then, the region edge strength computing unit 316 defines, as an upper edge region, 10 continuous x-direction lines that start from the upper edge of the background image and are arranged in the direction opposite to the y direction. In addition, the region edge strength computing unit 316 defines the sum of the pixel values of pixels included in the upper edge region as the region edge strength of the upper edge region.

Similarly, the region edge strength computing unit 316 defines, as a lower edge region, 10 continuous x-direction lines that start from the lower edge of the background image and are arranged in the y direction. In addition, hereinafter, a series of pixels arranged in the y direction in the background image is referred to as a "y-direction line". Then, the region edge strength computing unit 316 defines, as a left edge region, 10 continuous y-direction lines that start from the left edge of the background image and are arranged in the x direction. Furthermore, the region edge strength computing unit 316 defines, as a right edge region, 10 continuous y-direction lines that start from the right edge of the background image and are arranged in the direction opposite to the x direction.

Since the pixel value of a pixel of the background image represents the value of the edge strength, each of the region edge strengths represents the edge strength of a region of a background portion among regions in the vicinity of an end edge of the input image. The region edge strength computing unit 316 supplies the region edge strength computed for each of the regions to the conversion unit 319.

The histogram generating unit 317 generates a histogram of the edge strengths of the background image using the background image supplied from the multiplier unit 315 and supplies the histogram to the score computing unit 318. The score computing unit 318 computes the edge score using the histogram supplied from the histogram generating unit 317 and supplies the edge score to the conversion unit 319. Here, the edge score indicates the complexity of the edge of the background portion in the input image.

The conversion unit 319 converts the edge score supplied from the score computing unit 318 into the number of points for edge using a prestored conversion table. The number of points for an edge obtained through the conversion indicates an evaluation level of the attractiveness of the input image using the complexity of the edge of the background portion in the input image as an indicator. In addition, the conversion unit 319 supplies the number of points for the edge obtained through the conversion and the region edge strength supplied from the region edge strength computing unit 316 to the advice generating unit 27.

Configuration of Color Saturation Point Computing Unit

Figure 11:
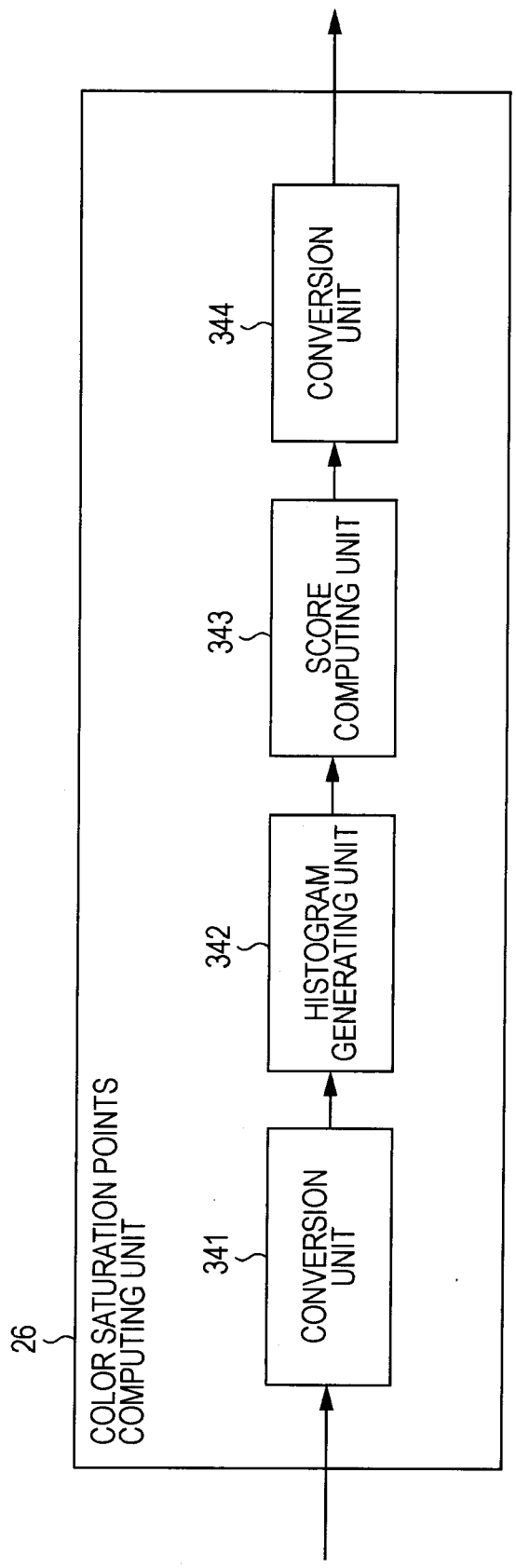
FIG. 11 illustrates an exemplary configuration of a saturation points computing unit.

The color saturation points computing unit 26 shown in FIG. 1 has a configuration as illustrated in FIG. 11 in detail.

That is, the color saturation points computing unit 26 includes a conversion unit 341, a histogram generating unit 342, a score computing unit 343, and a conversion unit 344.

The conversion unit 341 converts an input image supplied from the acquiring unit 22 and including R, G, and B components into an input image including H (hue), S (saturation), and V (value) components and supplies the converted input image to the histogram generating unit 342.

The histogram generating unit 342 generates a histogram of the saturation of pixels that satisfy a predetermined condition among the pixels of the input image supplied from the conversion unit 341 and supplies the histogram to the score computing unit 343. The score computing unit 343 computes a saturation score using the histogram supplied from the histogram generating unit 342 and supplies the saturation score to the conversion unit 344. Note that the saturation score is formed from the average value and variance value of all the saturation components of the input image.

The conversion unit 344 converts the saturation score supplied from the score computing unit 343 into the number of points for saturation using a prestored conversion table and supplies the number of points for saturation to the advice generating unit 27. The number of points for saturation obtained through the conversion represents the evaluation level of the attractiveness of the input image using the average value and variance value of all the saturation components of the input image as an indicator.

Description of Image Capturing Process

When the user operates the image processing apparatus 11 shown in FIG. 1 and selects an image capturing mode in which an image is captured, the image processing apparatus 11 starts an image capturing process in response to the user instruction.

The image capturing process performed by the image processing apparatus 11 is described below with reference to a flowchart shown in FIG. 12.

In step S11, the acquiring unit 22 acquires an input image captured by the image pickup unit 21 and supplies the input image to the units from the blur level points computing unit 23 to the color saturation points computing unit 26.

For example, the acquiring unit 22 acquires the image data of an input image for one frame from the image pickup unit 21. In addition, the display control unit 28 supplies the input image supplied from the image pickup unit 21 to the display unit 29 and instructs the display unit 29 to display the input image. In this way, the user can determine the composition of the input image to be captured while viewing the displayed input image.

In step S12, the blur level points computing unit 23 performs a blur level points computing process so as to compute a number of points for the blur level of the input image and supplies the computed number of points to the advice generating unit 27. In addition, in step S13, the luminance points computing unit 24 performs a luminance points computing process so as to compute a number of points for the luminance and the average luminance of the input image and supplies the computed number of points to the advice generating unit 27.

In step S14, the edge points computing unit 25 performs an edge points computing process so as to compute a number of points for the edge of the input image and the region edge strength and supplies the number of points computed for the edge and the region edge strength to the advice generating unit 27. In step S15, the color saturation points computing unit 26 performs a saturation points computing process so as to compute a number of points for the saturation of the input image and supplies the number of points computed for the saturation to the advice generating unit 27.

Note that the processes from the blur level points computing process to the saturation level computing process performed in steps S12 to S15 are described in more detail below.

In step S16, the advice generating unit 27 performs an advice generating process so as to generate an advice message using the number of points for each of the features, the average luminance, and the region edge strength supplied from the units from the blur level points computing unit 23 to the color saturation points computing unit 26. Basically, the number of points for each of the features is compared with a threshold value, and an advice message is selected from among advice messages previously prepared for the features in accordance with the result of the comparison. The selected advice message is supplied from the advice generating unit 27 to the display control unit 28. Note that the advice generating process is described in more detail below.

In step S17, the display control unit 28 supplies the advice received from the advice generating unit 27 to the display unit 29, which displays the advice. The displayed advice is in the form of a text message. The text message advises the user what to do in order to increase the number of points for each of the features of the input image. More specifically, for example, the advice text message "Turn on flash" is displayed on the display unit 29.

If the user captures an input image while following the advice displayed in this manner, the user can capture an input image having a higher number of points, that is, a more attractive image. When the user operates the image processing apparatus 11 while following the advice, the image processing apparatus 11 performs a process in accordance with the operation. For example, when the user operates the image processing apparatus 11 in order to adjust the white balance, the image processing apparatus 11 adjusts the white balance of the input image in accordance with the user operation.

In step S18, the acquiring unit 22 determines whether the user has instructed the image processing apparatus 11 to capture the input image. If, in step S18, it is determined that the user has instructed the image processing apparatus 11 to capture the input image, the image pickup unit 21 captures the input image in step S19. The acquiring unit 22 captures, from among the frames supplied from the image pickup unit 21, a frame corresponding to the time at which image capturing is instructed, and considers the image of the frame as the captured input image. Thereafter, the acquiring unit 22 supplies the acquired input image to a recording unit (not shown), which records the input image. Note that at that time, the captured input image may be displayed on the display unit 29.

However, if, in step S18, it is determined that the user has not instructed the image processing apparatus 11 to capture the input image, the input image is not captured. The processing proceeds to step S20.

If, in step S18, it is determined that the user has not instructed the image processing apparatus 11 to capture the input image or if, in step S19, the input image is captured, the image processing apparatus 11, in step S20, determines whether the processing is to be completed. For example, if the user instructs the image processing apparatus 11 to complete the image capturing mode, it is determined that the processing is to be completed.

If, in step S20, it is determined that the processing is not to be completed, the processing returns to step S11 and the above-described processes are repeated. That is, the input image representing a frame corresponding to another point of time is displayed, and an advice message generated for the input image is displayed.

However, if, in step S20, it is determined that the processing is to be completed, the image processing apparatus 11 stops the current processing. Thus, the image capturing process is completed.

In this way, the image processing apparatus 11 obtains the number of points for each of the features of the input image. Subsequently, the image processing apparatus 11 generates advice for capturing a more attractive image and displays the advice. By generating advice using the number of points for each of the features and displaying the advice in this manner, optimal advice can be presented to the user.

That is, by extracting each of the features from the input image and evaluating the input image using the indices based on the features, evaluation of the input image can be reliably performed regardless of the composition of the input image and what the subject is. If, for example, one of the numbers of points for the individual features is low, evaluation based on the index of the feature is low and, therefore, the attractiveness of the input image is decreased. In such a case, by presenting predetermined advice for the feature, that is, advice for increasing the number of points of the feature to the user, the attractiveness of the input image can be increased.

In the image processing apparatus 11, since the attractiveness of the input image is evaluated in terms of each of the features and advice in accordance with the evaluation is presented, optimal advice can be presented for any subject, not only a person. In addition, since the input image is evaluated in terms of each of the features, the composition of the input image is not limited to a particular one.

While the description above has been made with reference to the example in which advice is presented when the input image is captured, the advice may be presented for the already captured input image. In such a case, one of the recorded input images is selected. Thereafter, the processing in steps S12 to S17 shown in FIG. 12 is performed on the selected input image, and advice is presented for the input image.

Description of Blur Level Points Computing Process

Figure 12:
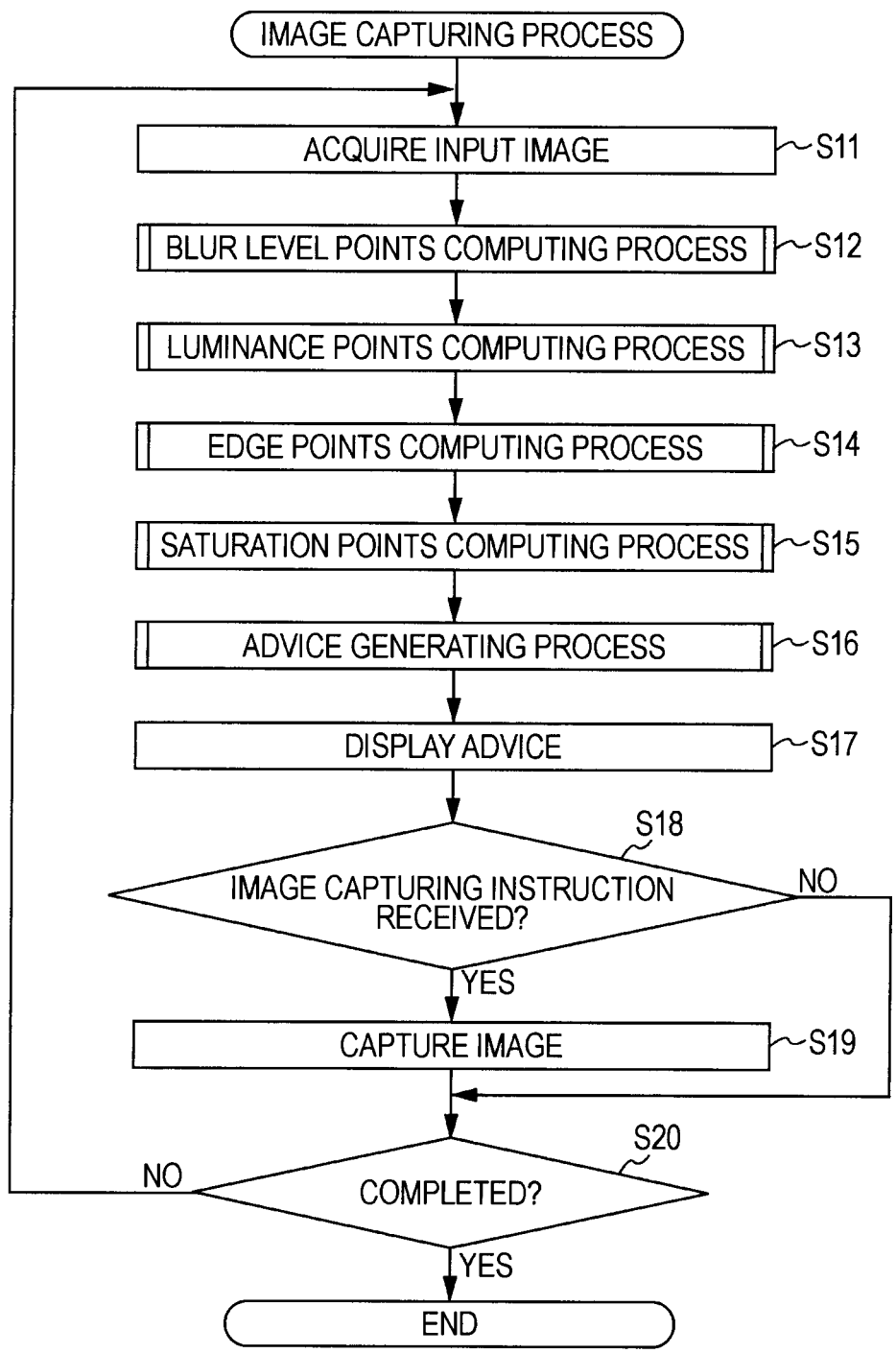
FIG. 12 is a flowchart of an exemplary image capturing process.

An exemplary blur level points computing process corresponding to the process performed in step S12 shown in FIG. 12 is described next with reference to the flowchart shown in FIG. 13.

In step S51, the edge map generating unit 61 generates an edge map using the input image supplied from the acquiring unit 22.

More specifically, the edge map generating unit 61 separates the input image into blocks each containing a 2-by-2 pixel array. Thereafter, the edge map generating unit 61 computes the absolute values $M_{TL-TR}$ to $M_{BL-BR}$ of a difference in pixel value between pixels in each block as follows:

$$M_{TL-TR} = |a-b| \quad (1)$$

$$M_{TL-BL} = |a-c| \quad (2)$$

$$M_{TL-BR} = |a-d| \quad (3)$$

$$M_{TR-BL} = |b-c| \quad (4)$$

$$M_{TR-BR} = |b-d| \quad (5)$$

$$M_{BL-BR} = |c-d| \quad (6)$$

Figure 14:
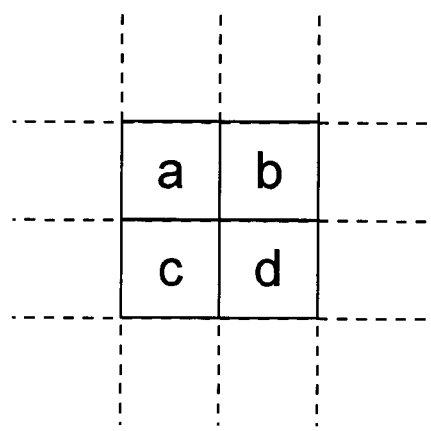
FIG. 14 illustrates generation of an edge map.

In equations (1) to (6), a, b, c, and d denote the pixel values of the pixels in a 2-by-2-pixel block. For example, as shown in FIG. 14, the pixel value a denotes the pixel value of the upper left pixel in the block. In addition, the pixel value b denotes the pixel value of the upper right pixel in the block. The pixel value c denotes the pixel value of the lower left pixel in the block. The pixel value d denotes the pixel value of the lower right pixel in the block.

Accordingly, each of the absolute values $M_{TL-TR}$ to $M_{BL-BR}$ represents the absolute value of a difference in pixel value between neighboring pixels in one of the pixel directions in the block.

Subsequently, the edge map generating unit 61 computes an average value $M_{AVE}$ of the absolute values $M_{TL-TR}$ to $M_{BL-BR}$ as follows:

$$M_{Ave} = \frac{M_{TL-TR} + M_{TL-BL} + M_{TL-BR} + M_{TR-BL} + M_{TR-BR} + M_{BL-BR}}{6} \quad (7)$$

Note that the average value $M_{AVE}$ represents the average value of the edge strengths in the vertical direction, the horizontal direction, the up-left diagonal direction, and up-right diagonal direction.

The edge map generating unit 61 arranges the computed average values $M_{AVE}$ of the blocks of the input image so that the arrangement of the computed average values $M_{AVE}$ is the same as that of the blocks. In this way, the edge map with the scale SC1 is generated.

In addition, in order to generate an edge map with the scale SC2 and an edge map with the scale SC3, the edge map generating unit 61 generates averaged images with the scale SC2 and the scale SC3 as follows:

$$P^{i+1}_{(m,n)} = \frac{P^i_{(2m,2n)} + P^i_{(2m,2n+1)} + P^i_{(2m+1,2n)} + P^i_{(2m+1,2n+1)}}{4} \quad (8)$$

Note that in equation (8), $P^i(x, y)$ represents the pixel value of a pixel located at the coordinates (x, y) in the averaged image with a scale $SC_i$ (i=1 or 2). In addition, $P^{i+1}(x, y)$ represents the pixel value of a pixel located at the coordinates (x, y) in the averaged image with a scale $SC_{i+1}$. The average image with the scale SC1 represents the input image.

Accordingly, the averaged image with a scale SC2 has pixels each having a pixel value equal to the average value of the pixel values of the pixels in a block obtained by separating the input image into 2-by-2-pixel blocks. In addition, the averaged image with a scale SC3 has pixels each having a pixel value equal to the average value of the pixel values of the pixels in a block obtained by separating the averaged image with the scale SC2 into 2-by-2-pixel blocks.

The edge map generating unit 61 performs a process that is the same as the process performed on the input image using equations (1) to (7) on the averaged image with the scale SC2 and the averaged image with the scale SC3. Thus, the edge map generating unit 61 generates edge maps with the scale SC2 and the scale SC3.

Accordingly, the edge maps with the scale SC2 and SC3 represent images obtained by extracting the edge components in different frequency ranges from the input image. Note that the number of pixels of the edge map with the scale SC1 is ¼ that of the input image (vertically ½ and horizontally ½), the number of pixels of the edge map with the scale SC2 is 1/16 that of the input image (vertically ¼ and horizontally ¼), and the number of pixels of the edge map with the scale SC3 is 1/64 that of the input image (vertically ⅛ and horizontally ⅛).

The edge map generating unit 61 supplies the generated edge maps with the scales SC1 to SC3 to the dynamic range detecting unit 62 and the local max generating unit 64. By generating the edge maps with different scales using blocks having different sizes in this manner, a variation in edge strength can be prevented.

In step S52, the dynamic range detecting unit 62 detects the dynamic range of the input image using the edge maps supplied from the edge map generating unit 61 and supplies the result of the detection to the computation parameter control unit 63.

More specifically, the dynamic range detecting unit 62 detects the maximum value and the minimum value of the pixel values from among the edge maps with the scales SC1 to SC3. Thereafter, the dynamic range detecting unit 62 subtracts the detected minimum value from the detected maximum value. The resultant value serves as the dynamic range of the edge strength of the input image. That is, the difference between the maximum value and the minimum value of the edge strength of the input image is detected as the dynamic range.

As an alternative to the above-described method, for example, the dynamic range may be detected for each of the edge maps, and the maximum value or the average value of the detected dynamic ranges may be used as a dynamic range to be actually used.

In step S53, the computation parameter control unit 63 sets the initial values of the computation parameters in accordance with the dynamic range supplied from the dynamic range detecting unit 62.

That is, if the dynamic range is lower than a predetermined threshold value, the computation parameter control unit 63 defines the input image as a low dynamic range image. However, if the dynamic range is higher than or equal to the predetermined threshold value, the computation parameter control unit 63 defines the input image as a high dynamic range image.

Subsequently, if the input image is a low dynamic range image, the computation parameter control unit 63 sets the computation parameters to the initial values for a low dynamic range image. However, if the input image is a high dynamic range image, the computation parameter control unit 63 sets the computation parameters to the initial values for a high dynamic range image.

Note that it is highly likely that a low dynamic range image has less edges than a high dynamic range image and, therefore, has fewer extracted edge pixels than a high dynamic range image. Accordingly, in order to extract the number of edge pixels sufficient to maintain detection accuracy of the blur level of the input image equal to a predetermined level or higher, the initial value of an edge reference value for a low dynamic range image is set to a value smaller than that for a high dynamic range image. In addition, the initial value of an extraction reference value for a low dynamic range image is set to a value smaller than that for a high dynamic range image.

The computation parameter control unit 63 supplies the edge reference value set in accordance with the dynamic range to the edge pixel extracting unit 65 and supplies the edge reference value and the extraction reference value to the extracted amount determination unit 66.

In step S54, the local max generating unit 64 generates a local max using the edge maps supplied from the edge map generating unit 61 and supplies the generated local max to the edge pixel extracting unit 65 and the edge analyzing unit 67.

Figure 15:
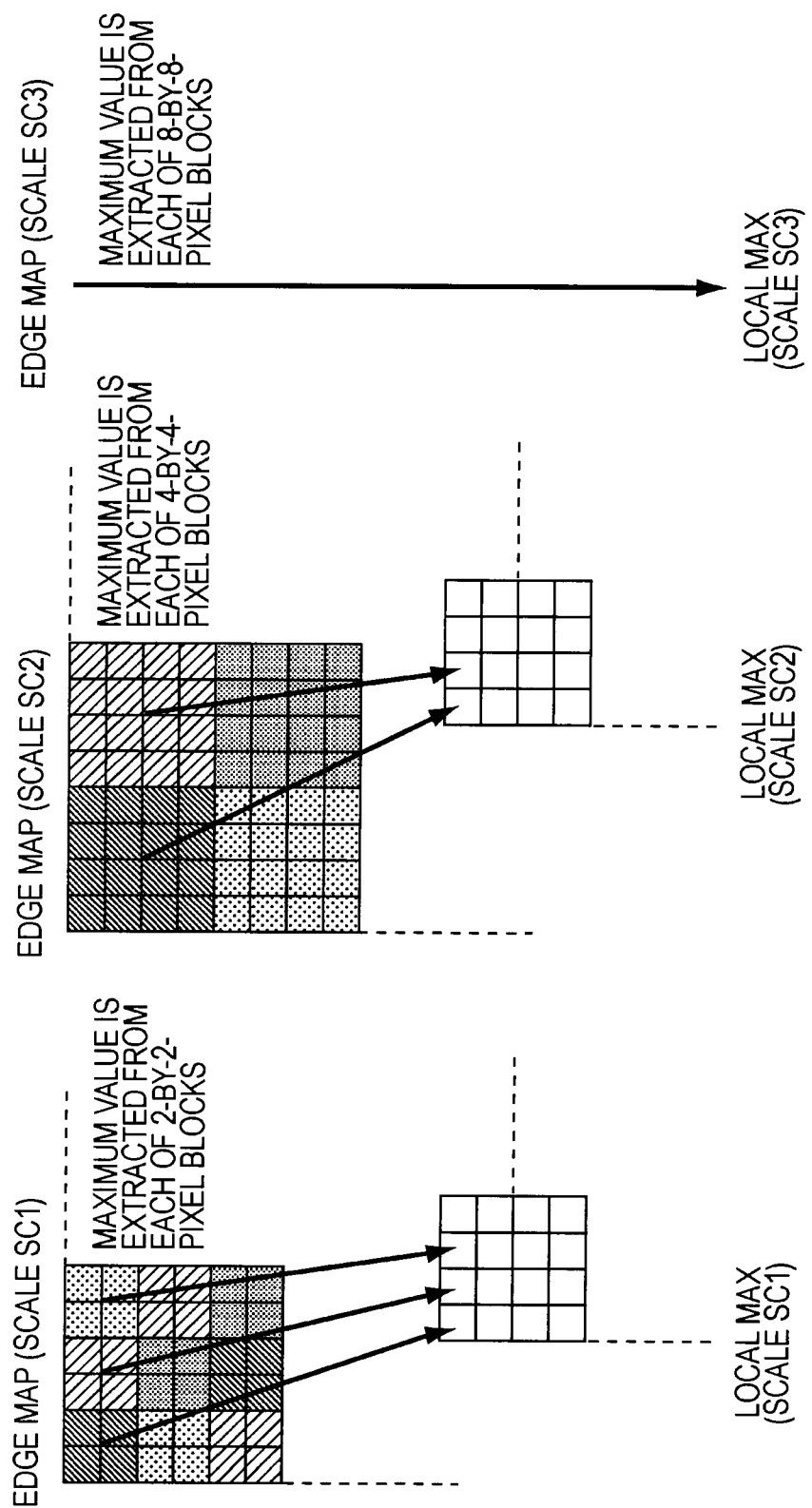
FIG. 15 illustrates generation of a local max.

For example, as indicated by the left-hand side of FIG. 15, the local max generating unit 64 separates an edge map with the scale SC1 into 2-by-2-pixel blocks. Thereafter, the local max generating unit 64 extracts the maximum value of each of the blocks of the edge map and arranges the extracted maximum values in a pattern equal to that of the blocks from which the maximum values are extracted. Thus, the local max generating unit 64 generates a local max LM1 for the scale SC1. That is, the maximum value of the pixel values of pixels in each of the blocks can be extracted.

In addition, as indicated by the middle of FIG. 15, the local max generating unit 64 separates the edge map with the scale SC2 into 4-by-4-pixel blocks. Thereafter, the local max generating unit 64 extracts the maximum value of each of the blocks of the edge map and arranges the extracted maximum values in a pattern equal to that of the blocks from which the maximum values are extracted. Thus, the local max generating unit 64 generates a local max LM2 for the scale SC2.

Furthermore, as indicated by the right-hand side of FIG. 15, the local max generating unit 64 separates an edge map with the scale SC3 into 8-by-8-pixel blocks. Thereafter, the local max generating unit 64 extracts the maximum value of each of the blocks of the edge map and arranges the extracted maximum values in a pattern equal to that of the blocks from which the maximum values are extracted. Thus, the local max generating unit 64 generates a local max LM3 for the scale SC3.

In step S55, the edge pixel extracting unit 65 extracts edge pixels from the input image using the edge reference value supplied from the computation parameter control unit 63 and the local max supplied from the local max generating unit 64.

More specifically, the edge pixel extracting unit 65 selects one of the pixels of the input image as a pixel of interest. In addition, the edge pixel extracting unit 65 defines the coordinates of the selected pixel of interest of the input image in a x-y coordinate system as (x, y) and computes coordinates (x1, y1) of a pixel of the local max LM1 corresponding to the pixel of interest as follows:

$$(x1, y1) = (x/4, y/4) \quad (9)$$

Note that in equation (9), each of x/4 and y/4 is truncated to an integer.

Since one of the pixels of the local max LM1 is formed from a 4-by-4-pixel block of the input image, the coordinates of the pixel of the local max LM1 corresponding to the pixel of interest of the input image are ¼ of the x coordinate and ¼ of the y coordinate of the pixel of interest.

In a similar manner, the edge pixel extracting unit 65 computes coordinates (x2, y2) of a pixel of the local max LM2 corresponding to the pixel of interest and coordinates (x3, y3) of a pixel of the local max LM3 corresponding to the pixel of interest as follows:

$$(x2, y2) = (x/16, y/16) \quad (10)$$

$$(x3, y3) = (x/64, y/64) \quad (11)$$

Note that in equations (10) and (11), each of x/16, y/16, x/64 and y/64 is truncated to an integer.

Furthermore, if the pixel value of a pixel located at the coordinate (x1, y1) of the local max LM1 is greater than or equal to the edge reference value, the edge pixel extracting unit 65 extracts the pixel of interest as an edge pixel of the local max LM1. Thereafter, the edge pixel extracting unit 65 associates the coordinates (x, y) of the pixel of interest with the pixel value at the coordinates (x1, y1) of the local max LM1 and stores that information.

In a similar manner, if the pixel value of a pixel located at the coordinate (x2, y2) of the local max LM2 is greater than or equal to the edge reference value, the edge pixel extracting unit 65 extracts the pixel of interest as an edge pixel of the local max LM2. Thereafter, the edge pixel extracting unit 65 associates the coordinates (x, y) of the pixel of interest with the pixel value at the coordinates (x2, y2) of the local max LM2 and stores that information. In addition, if the pixel value of a pixel located at the coordinate (x3, y3) of the local max LM3 is greater than or equal to the edge reference value, the edge pixel extracting unit 65 extracts the pixel of interest as an edge pixel of the local max LM3. Thereafter, the edge pixel extracting unit 65 associates the coordinates (x, y) of the pixel of interest with the pixel value at the coordinates (x3, y3) of the local max LM3 and stores that information.

The edge pixel extracting unit 65 repeats the above-described processing until all of the pixels of the input image have been selected as a pixel of interest.

In this way, using the local max LM1, among the 4-by-4-pixel blocks in the input image, pixels included in a block having an edge strength higher than or equal to the edge reference value are selected as edge pixels.

Similarly, using the local max LM2, among the 16-by-16-pixel blocks in the input image, pixels included in a block having an edge strength higher than or equal to the edge reference value are selected as edge pixels. Furthermore, using the local max LM3, among the 64-by-64-pixel blocks in the input image, pixels included in a block having an edge strength higher than or equal to the edge reference value are selected as edge pixels.

Accordingly, a pixel includes at least one of a 4-by-4-pixel block, a 16-by-16-pixel block, and a 64-by-64-pixel block of the input image having an edge strength higher than or equal to the edge reference value is extracted as an edge pixel.

The edge pixel extracting unit 65 generates an edge pixel table ET1 including a correspondence between the coordinates (x, y) of an edge pixel extracted using the local max LM1 and the pixel value of a pixel of the local max LM1 corresponding to the edge pixel.

In a similar manner, the edge pixel extracting unit 65 generates an edge pixel table ET2 including a correspondence between the coordinates (x, y) of an edge pixel extracted using the local max LM2 and the pixel value of a pixel of the local max LM2 corresponding to the edge pixel. In addition, the edge pixel extracting unit 65 generates an edge pixel table ET3 including a correspondence between the coordinates (x, y) of an edge pixel extracted using the local max LM3 and the pixel value of a pixel of the local max LM3 corresponding to the edge pixel.

Subsequently, the edge pixel extracting unit 65 supplies the generated edge pixel tables to the extracted amount determination unit 66.

In step S56, the extracted amount determination unit 66 determines whether the number of extracted edge pixels is appropriate using the edge pixel tables supplied from the edge pixel extracting unit 65. For example, if the sum of the numbers of the extracted edge pixels, that is, the sum of the data items included in the edge pixel tables ET1 to ET3 is less than the extraction reference value supplied from the computation parameter control unit 63, the extracted amount determination unit 66 determines that the extracted edge pixel number is not appropriate.

If, in step S56, the extracted amount determination unit 66 determines that the extracted edge pixel number is not appropriate, the extracted amount determination unit 66 sends, to the computation parameter control unit 63, a message indicating that the extracted edge pixel number is not appropriate. Thereafter, the processing proceeds to step S57.

In step S57, the computation parameter control unit 63 adjusts the computation parameters in accordance with the message received from the extracted amount determination unit 66.

For example, the computation parameter control unit 63 reduces the currently set edge reference value by a predetermined amount so that a number of edge pixels higher than that of a current setting are extracted. The computation parameter control unit 63 supplies the adjusted edge reference value to the edge pixel extracting unit 65 and the extracted amount determination unit 66.

After the computation parameters are adjusted, the processing returns to step S55. Thereafter, the above-described processing is repeated until it is determined that the number of extracted edge pixels is appropriate.

However, if, in step S56, the extracted amount determination unit 66 determines that the number of extracted edge pixels is not appropriate, the extracted amount determination unit 66 supplies the edge reference value supplied from the computation parameter control unit 63 and the edge pixel tables to the edge analyzing unit 67. Thereafter, the processing proceeds to step S58.

Through the above-described processing, in order to increase the detection accuracy of a blur level for a low dynamic range input image, an edge pixel is extracted from even a block having a low edge strength so that the number of edge pixels sufficient for increasing the detection accuracy of a blur level to a certain level can be obtained. In contrast, for a high dynamic range input image, an edge pixel is extracted from a block having a maximum edge strength. Thus, an edge pixel that constitutes a stronger edge can be extracted.

In step S58, the edge analyzing unit 67 performs edge analysis using the edge reference value and the edge pixel tables supplied from the extracted amount determination unit 66 and the local maxes supplied from the local max generating unit 64.

More specifically, the edge analyzing unit 67 selects one of the edge pixels extracted from the input image as a pixel of interest using the edge pixel tables ET1 to ET3. Thereafter, the edge analyzing unit 67 defines the coordinates of the pixel of interest in the x-y coordinate system as (x, y). Subsequently, the edge analyzing unit 67 computes the coordinates (x1, y1) to (x3, y3) of the local maxes LM1 to LM3 using equations (9) to (11) described above.

The edge analyzing unit 67 focuses on an m-by-m-pixel block (e.g., a 4-by-4-pixel block) in the local max LM1, the upper left corner of the block being placed at the coordinates (x1, y1) of the local max LM1. Then, the edge analyzing unit 67 sets the maximum pixel value of pixels in the m-by-m-pixel block in Local Max1(x1, y1). In addition, the edge analyzing unit 67 focuses on an n-by-n-pixel block (e.g., a 2-by-2-pixel block) in the local max LM2, the upper left corner of the block being placed at the coordinates (x2, y2) of the local max LM2. Then, the edge analyzing unit 67 sets the maximum pixel value of pixels in the n-by-n-pixel block in Local Max2(x2, y2). Furthermore, the edge analyzing unit 67 sets the pixel value of a pixel located at coordinates (x3, y3) of the local max LM3 in Local Max3(x3, y3).

Note that the parameters "m×m" used for setting Local Max1(x1, y1) and "n×n" used for setting Local Max2(x2, y2) are parameters used for controlling the difference among the sizes of blocks in the input image corresponding to one pixel of the local max LM1 to the local max LM3.

The edge analyzing unit 67 determines whether Local Max1(x1, y1), Local Max2(x2, y2), and Local Max3(x3, y3) satisfy the following conditional expression:

$$\text{Local Max1}(x1,y1) > \text{edge reference value},$$

$$\text{Local Max2}(x2,y2) > \text{edge reference value, or}$$

$$\text{Local Max3}(x3,y3) > \text{edge reference value} \quad (12)$$

If Local Max1(x1, y1), Local Max2(x2, y2), and Local Max3(x3, y3) satisfy conditional expression (12), the edge analyzing unit 67 increments a variable $N_{edge}$ by one.

Note that it is highly likely that an edge pixel that satisfies conditional expression (12) is an edge pixel that constitutes an edge having a strength higher than or equal to a predetermined value regardless of the structure of the edge (e.g., edges shown in FIGS. 16A to 16D).

Figure 16A:
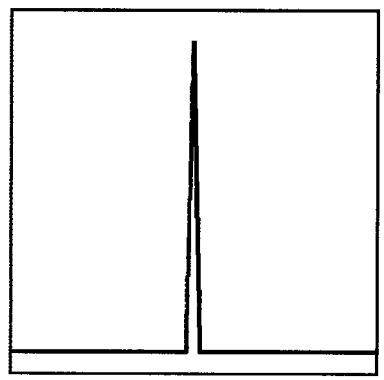
FIGS. 16A to 16D illustrate examples of an edge structure.
Figure 16B:
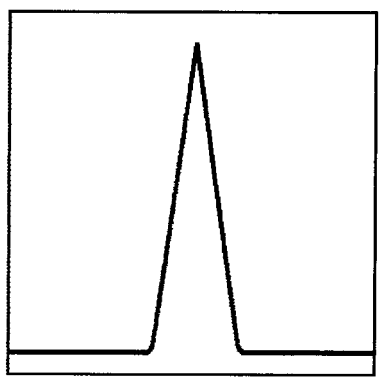
Figure 16C:
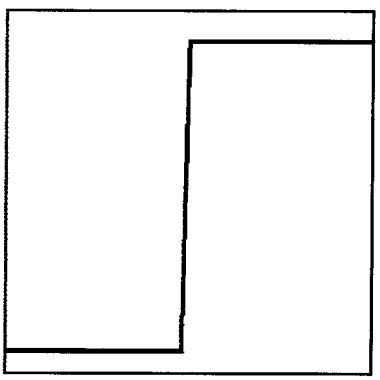
Figure 16D:
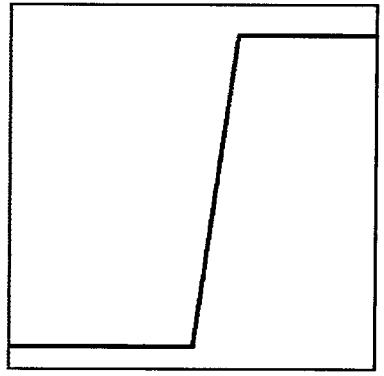

In FIG. 16A, a sharp impulse edge is shown. In FIG. 16B, an impulse edge having a slope gentler than that in FIG. 16A is shown. In FIG. 16C, a stepped edge having an almost vertical slope is shown. In FIG. 16D, a stepped edge having a slope gentler than that in FIG. 16C is shown.

If Local Max1(x1, y1), Local Max2(x2, y2), and Local Max3(x3, y3) satisfy conditional expression (12), the edge analyzing unit 67 further determines whether Local Max1 (x1, y1), Local Max2(x2, y2), and Local Max3(x3, y3) satisfy the following conditional expression (13) or (14):

$$\text{Local Max1}(x1,y1) < \text{Local Max2}(x2,y2) < \text{Local Max3}(x3,y3) \quad (13)$$

$$\text{Local Max2}(x2,y2) > \text{Local Max1}(x1,y1), \text{ and}$$

$$\text{Local Max2}(x2,y2) > \text{Local Max3}(x3,y3) \quad (14)$$

If Local Max1(x1, y1), Local Max2(x2, y2), and Local Max3(x3, y3) satisfy conditional expression (13) or (14), the edge analyzing unit 67 increments a variable $N_{smallblur}$ by one.

Note that it is highly likely that an edge pixel that satisfies conditional expression (12) and that satisfies conditional expression (13) or (14) has an edge strength higher than or equal to a predetermined value; however, the edge pixel is included in an edge that has an edge strength lower than that shown in FIG. 16A or 16C and that constitutes an edge shown in FIG. 16B or 16D.

Furthermore, if Local Max1(x1, y1), Local Max2(x2, y2), and Local Max3(x3, y3) satisfy conditional expression (12) and satisfy conditional expression (13) or (14), the edge analyzing unit 67 further determines whether Local Max1(x1, y1) satisfies the following conditional expression:

$$\text{Local Max1}(x1,y1) < \text{edge reference value} \quad (15)$$

If Local Max1(x1, y1) satisfies conditional expression (15), the edge analyzing unit 67 increments a variable $N_{largeblur}$ by one.

Note that it is highly likely that an edge pixel that satisfies conditional expression (12) and that satisfies conditional expression (13) or (14) and that satisfies conditional expression (15) constitutes an edge having an edge strength higher than or equal to a predetermined value and having a structure shown in FIG. 16B or 16D; however, the edge has blur and, therefore, the edge is unclear. That is, blur occurs at the edge pixel.

The edge analyzing unit 67 repeats the above-described processing until all of the edge pixels extracted from the input image have been selected as a pixel of interest. In this way, from the extracted edge pixels, the number of edge pixels $N_{edge}$, the number of edge pixels $N_{smallblur}$, and the number of edge pixels $N_{largeblur}$ can be obtained.

Note that the number $N_{edge}$ represents the number of the edge pixels that satisfy conditional expression (12), and the number $N_{smallblur}$ represents the number of the edge pixels that satisfy conditional expression (12) and one of conditional expressions (13) and (14). In addition, the number $N_{largeblur}$ represents the number of the edge pixels that satisfy conditional expression (12) and one of conditional expressions (13) and (14) and that satisfy conditional expression (15).

The edge analyzing unit 67 supplies the obtained numbers $N_{smallblur}$ and $N_{largeblur}$ to the blur level detecting unit 68.

In step S59, the blur level detecting unit 68 computes the following equation (16) using the numbers $N_{smallblur}$ and $N_{largeblur}$ supplied from the edge analyzing unit 67 and obtains, as a blur level score, a blur level BlurEstimation that serves as an index indicating how large the blur of the input image is:

$$\text{BlurEstimation} = \frac{N_{largeblur}}{N_{smallblur}} \quad (16)$$

That is, the blur level BlurEstimation is a ratio of the number of edge pixels that are estimated to constitute an edge at which blur occurs to the number of edge pixels that are estimated to constitute an edge having an edge strength higher than or equal to a predetermined value and having the structure as shown in FIG. 16B or 16D. Accordingly, as the blur level BlurEstimation increases, the input image is more blurred.

After computing the blur level score, the blur level detecting unit 68 supplies the computed blur level score to the conversion unit 69. Since, in computing the blur level score, the conditions for extracting edge pixels and the number of the extracted edge pixels are appropriately controlled for each input image, the blur level of the input image can be highly accurately detected.

In step S60, the conversion unit 69 converts the blur level score supplied from the blur level detecting unit 68 into a number of points for the blur level using the prestored conversion table and supplies the number of points for the blur level to the advice generating unit 27.

For example, suppose that the blur level score ranges from 0 to 1, and the blur of the entire input image increases as the blur level score increases. Then, the conversion unit 69 obtains the number of points for the blur level using a blur level score conversion table shown in FIG. 17.

That is, when the blur level score is lower than 0.2, the number of points for the blur level is 10. When the blur level score is higher than or equal to 0.2 and is lower than 0.3, the number of points for the blur level is 9. When the blur level score is higher than or equal to 0.3 and is lower than 0.5, the number of points for the blur level is 8.

In addition, when the blur level score is higher than or equal to 0.5 and is lower than 0.7, the number of points for the blur level is 7. When the blur level score is higher than or equal to 0.7 and is lower than 0.9, the number of points for the blur level is 5. When the blur level score is higher than 0.9, the number of points for the blur level is 0.

Here, the number of points determined in accordance with the range of the blur level score is determined using the blur level score obtained from professional images and amateur images captured in advance. As used herein, the terms "professional images" and "amateur images" refer to images captured by professional photographers and having high public evaluation (high attractiveness) and images captured by amateur photographers and having low public evaluation (low attractiveness), respectively.

Figure 18:
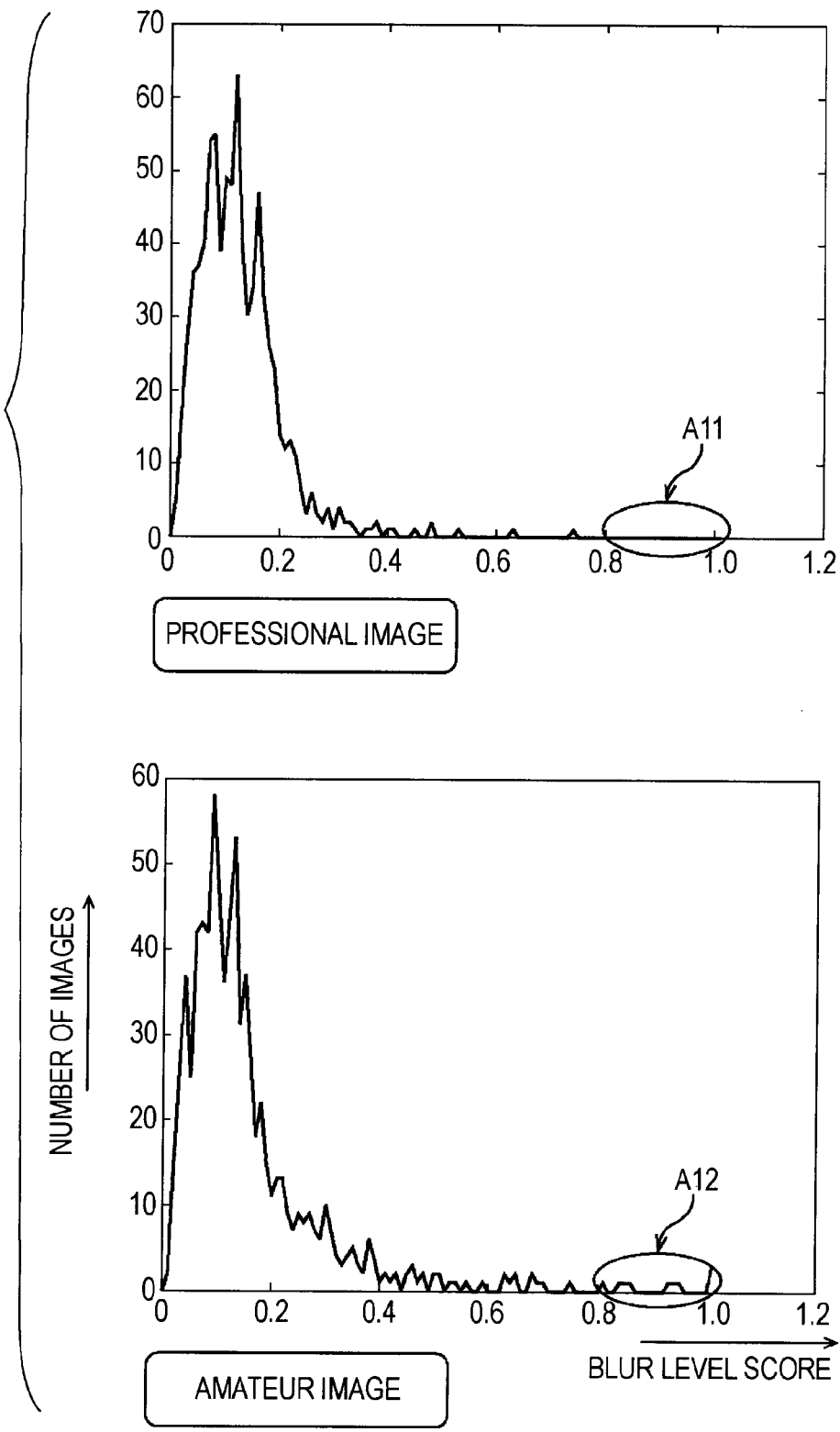
FIG. 18 illustrates a method for assigning the number of points to a blur level score.

For example, suppose that a blur level score is acquired for each of a plurality of professional images and amateur images, and the result is obtained as shown in FIG. 18. Note that in FIG. 18, the ordinate represents the number of sample professional images or the number of amateur sample images, and the abscissa represents a blur level score.

In FIG. 18, the distribution of the blur level scores of the professional images is shown in the upper section, while the distribution of the blur level scores of the amateur images is shown in the lower section.

The blur level scores of almost all of the sample professional images are lower than 0.3, and no sample professional images have a blur level score higher than or equal to 0.8. That is, as the blur level of the image decreases, the blur level score decreases. Accordingly, among the professional images, there are few blurred images.

In contrast, the blur level scores of almost all of the sample amateur images are lower than 0.4. However, the blur level scores of several sample amateur images are higher than or equal to 0.4. That is, several entirely blurred images are included in the sample amateur images.

As can be seen from a comparison of the blur level scores of professional images and the blur level scores of amateur images, no professional images appear in the range indicated by an arrow A11 in the distribution of the professional images. That is, no professional images have a blur level score higher than or equal to 0.8. In contrast, several amateur images appear in the range indicated by an arrow A12 in the distribution of the amateur images. That is, several amateur images have a blur level score higher than or equal to 0.8.

Accordingly, if a blur level score of an input image is higher than or equal to 0.8, it is highly likely that the input image is an amateur image, that is, a badly captured and less attractive image. Therefore, if the input image has a blur level score higher than or equal to 0.8, that is, if it is highly likely that the input image is an amateur image, the number of points given to the blur level is determined to have a small value so that evaluation based on the number of points for the blur level is decreased. In addition, in general, if the entirety of an image is less blurred, the image is appraised more highly. Thus, the number of points given to the blur level is determined to have a larger value as the blur level score decreases.

Note that for the score of each of the other features, the number of points given for each range of the score is also determined by comparing the scores of the features of professional images with those of amateur images prepared in advance, and conversion tables for the scores of the features are generated in advance.

At that time, by giving a higher number of points or a lower number of points to a range of the score in which a difference in distribution of a score between professional images and amateur images is significant for each of the features, more appropriate (correct) evaluation can be performed on the input image in terms of the attractiveness of an image. That is, the accuracy of evaluation can be increased.

Figure 13:
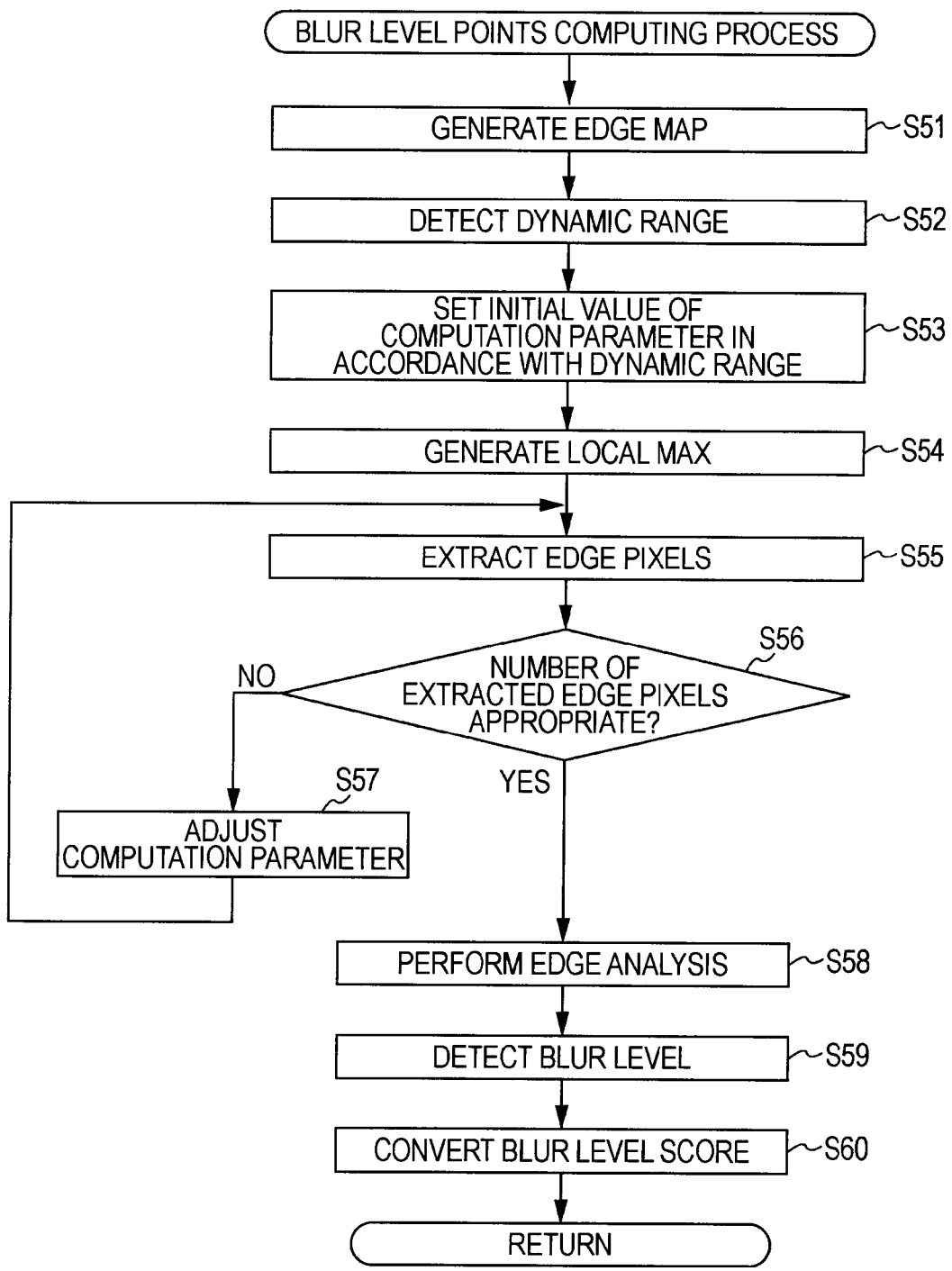
FIG. 13 is a flowchart of an exemplary blur level points computing process.

Referring back to the flowchart shown in FIG. 13, after the blur level score is converted into a number of points for the blur level using the conversion table, the blur level points computing process is completed, and the processing proceeds to step S13 shown in FIG. 12.

As described above, the blur level points computing unit 23 detects the blur level from the input image and computes, on the basis of the result of the detection, the number of points for the blur level that indicates the evaluation of the attractiveness of the input image. While the process has been described above with reference to the blur level score that indicates the blur level of the entire input image, the blur level score may be computed using the blur level of only a subject portion of the input image.

Description of Luminance Points Computing Process

An exemplary luminance points computing process corresponding to the process performed in step S13 shown in FIG. 12 is described next with reference to the flowchart shown in FIG. 19.

In step S81, the average luminance computing unit 91 computes the average luminance of the input image using the input image supplied from the acquiring unit 22 and supplies the average luminance to the conversion unit 97. For example, the average luminance computing unit 91 computes the luminance value of each of the pixels of the input image using the pixel value of the pixel and further computes an average value of the luminance values of the pixels as an average luminance.

In step S82, the subject extracting unit 92 performs a subject map generating process and generates a subject map from the input image supplied from the acquiring unit 22. Thereafter, the subject extracting unit 92 supplies the generated subject map to the multiplier unit 93. Note that the subject map generating process is described in more detail below.

In step S83, the multiplier unit 93 multiplies the input image supplied from the acquiring unit 22 by the subject map supplied from the subject extracting unit 92 and generates a subject image. Thereafter, the multiplier unit 93 supplies the generated subject image to the histogram generating unit 94. That is, when one of the pixels of the subject image is selected as a pixel of interest, the product of the pixel value of a pixel of the subject map and the pixel value of a pixel of the input image located at the location same as that of the pixel of interest is defined as the pixel value of the pixel of interest. The subject image represents the image of only the subject portion of the input image.

In step S84, the histogram generating unit 94 generates, using the subject image supplied from the multiplier unit 93, a histogram of the luminance containing bins representing the range of the luminance values of the pixels of the subject image and supplies the generated histogram to the normalization unit 95. The normalization unit 95 normalizes the histogram supplied from the histogram generating unit 94 and supplies the histogram to the score computing unit 96.

In step S85, the score computing unit 96 computes the luminance score using the histogram supplied from the normalization unit 95 and, for example, the K-Nearest Neighbor (K-NN) method. Thereafter, the score computing unit 96 supplies the computed luminance score to the conversion unit 97.

For example, the score computing unit 96 prestores a plurality of luminance histograms generated by performing a process that is the same as the process performed in steps S82 to S84 on professional images and amateur images prepared in advance. The score computing unit 96 computes a distance between each of the histograms of the prestored professional images and amateur images and the histogram supplied from the normalization unit 95.

That is, the score computing unit 96 defines the sum of differences in frequency value of each bin between the luminance histogram of the subject image and one of the prestored histograms as the difference between the histograms. That is, the difference in frequency value between the bins having the same representative value is computed, and the sum of the differences is defined as the difference between the histograms.

Subsequently, from among the differences between the histogram of the subject image and each of the prestored histograms, the score computing unit 96 selects k differences in ascending order.

In addition, from among the selected k differences, the score computing unit 96 subtracts the number of the differences between the histogram of the subject image and the histogram of an amateur image from the number of the differences between the histogram of the subject image and the histogram of a professional image. The score computing unit 96 then defines the resulting value as a luminance score.

As described earlier, the distance between the histogram of the subject image and each of the histograms of the professional image and the amateur image is defined as the sum of the differences between the frequency values of the bins of the histogram. Accordingly, as the luminance distributions of the images are more similar to each other, the distance becomes smaller. That is, as the distance becomes smaller, the subject image is more similar to the professional image or the amateur image to be processed.

In addition, as described earlier, the difference between the number of the distances between the histogram of the subject image and the histogram of the professional image and the number of the distances between the histogram of the subject image and the histogram of the amateur image is used as the luminance score. Accordingly, as the number of the professional images having a luminance distribution similar to that of the subject image increases, the luminance score increases. That is, the luminance score indicates the similarity of the subject image to the professional image in terms of a luminance distribution. The higher the luminance score of an input image, the higher the evaluation the input image can receive, that is, the more attractive the image is.

In step S86, the conversion unit 97 converts the luminance score supplied from the score computing unit 96 into points for luminance using a prestored conversion table. For example, the conversion unit 97 prestores a conversion table generated in advance in the same manner as for the conversion table prestored in the conversion unit 69 shown in FIG. 2. The conversion unit 97 converts the luminance score into points for luminance using the conversion table. As the luminance score increases, the luminance distribution of the subject portion is more similar to that of the professional image. Accordingly, as the luminance score increases, the luminance score is converted into a higher number of points.

After the conversion unit 97 converts the luminance score into the points for luminance, the conversion unit 97 supplies the converted points for luminance and the average luminance supplied from the average luminance computing unit 91 to the advice generating unit 27. Thereafter, the luminance points computing process is completed, and the processing proceeds to step S14 shown in FIG. 12.

As described above, the luminance points computing unit 24 extracts the region of the subject from the input image and compares the luminance distribution of the region of the subject with the luminance distribution of the region of the subject of each of the prestored professional images and amateur images. Thus, the luminance points computing unit 24 computes a luminance score. Thereafter, the luminance points computing unit 24 converts the computed luminance score into a point for luminance using the conversion table.

In this way, by comparing the luminance distributions for only the region of the subject in the input image and computing the point for luminance, the attractiveness of the input image can be further appropriately evaluated using the luminance distribution of the foreground (the subject) portion as an indicator.

For example, in general, an image having a subject portion of high luminance is highly evaluated as a good image even when the background is dark. In such a case, when the attractiveness of the entirety of the image is evaluated using the luminance distribution as an indicator, the image that has a background luminance distribution different from that of the professional image may be evaluated as a poor image although the luminance distribution of the subject portion is close to that of the professional image.

Thus, when the attractiveness of an image is evaluated using the luminance distribution as an indicator, the luminance distribution of the subject region of the image is important, and the luminance distribution of the background region is not necessary for evaluation at all times. That is, the input image can be sufficiently evaluated using the luminance distribution of the subject region. If the luminance distribution of the background region is taken into consideration, a method for evaluating an image may be complicated, or the image may be incorrectly evaluated.

Therefore, the luminance points computing unit 24 processes only the subject region of the input image and computes the number of points for luminance. In this way, the attractiveness of the input image can be more simply and appropriately evaluated.

Description of Subject Map Generating Process

Figure 19:
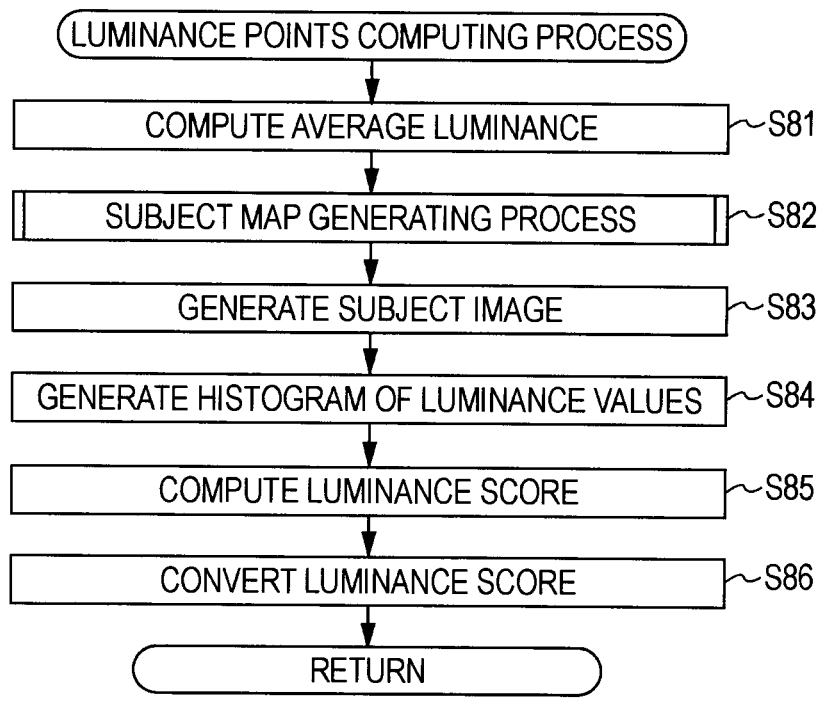
FIG. 19 is a flowchart of an exemplary luminance points computing process.

An exemplary subject map generating process corresponding to the process performed in step S82 shown in FIG. 19 is described next with reference to the flowchart shown in FIG. 20.

In step S111, the luminance information extracting unit 121 performs a luminance information extracting process and generates a luminance information map using the input image supplied from the acquiring unit 22 and supplies the generated luminance information map to the subject map generating unit 126. In step S112, the color information extracting unit 122 performs a color information extracting process and generates a color information map using the input image supplied from the acquiring unit 22. Thereafter, the color information extracting unit 122 supplies the color information map to the subject map generating unit 126.

In step S113, the edge information extracting unit 123 performs an edge information extracting process and generates an edge information map using the input image supplied from the acquiring unit 22 and supplies the generated edge information map to the subject map generating unit 126. In step S114, the face information extracting unit 124 performs a face information extracting process and generates a face information map using the input image supplied from the acquiring unit 22. Thereafter, the face information extracting unit 124 supplies the face information map to the subject map generating unit 126. In step S115, the motion information extracting unit 125 performs a motion information extracting process and generates a motion information map using the input image supplied from the acquiring unit 22. Thereafter, the motion information extracting unit 125 supplies the motion information map to the subject map generating unit 126.

Note that the luminance information extracting process, the color information extracting process, the edge information extracting process, the face information extracting process, and the motion information extracting process are described in more detail below.

In step S116, the subject map generating unit 126 generates a subject map using the luminance information map to the motion information map supplied from the units from the luminance information extracting unit 121 to the motion information extracting unit 125 and supplies the generated subject map to the multiplier unit 93 shown in FIG. 3.

For example, the subject map generating unit 126 linearly-combines the information maps using information weights Wb obtained for each of the information maps in advance. Thereafter, the subject map generating unit 126 normalizes the resulting map by multiplying the pixel value of each of the pixels of the resulting map by a predetermined subject weight Wc. Thus, the subject map is generated.

That is, one of the pixels of a subject map to be generated is selected as a pixel of interest. The pixel value of a pixel of each of the information maps located at a position the same as that of the pixel of interest is multiplied by the information weight Wb determined for the information map, and the resulting pixel values are summed. The sum is defined as the pixel value of the pixel of interest. In addition, the pixel value of each of the pixels of the subject map obtained in this manner is multiplied by the subject weight Wc obtained for the subject map in advance. Thereafter, the resulting pixel values are normalized. Thus, a final subject map can be generated.

More specifically, by using a color information map of an RG difference and a color information map of a BY difference as the color information maps and using the edge maps for 0-degree, 45-degree, 90-degree, and 135-degree directions as the edge information maps, the subject map is generated. In addition, the subject weight Wc is determined through a learning process performed in advance. The normalizing process is performed so that the pixel value of each of the pixels of the subject image is set to 0 or 1. That is, in the normalizing process, the pixel values of the pixels are binarized through threshold value processing using a predetermined threshold value.

After the subject map is generated in this manner and is supplied to the multiplier unit 93, the subject map generating process is completed, and the processing proceeds to step S83 shown in FIG. 19.

As described above, the subject extracting unit 92 extracts each of the information items from the input image and generates the subject map.

Description of Luminance Information Extracting Process

Figure 20:
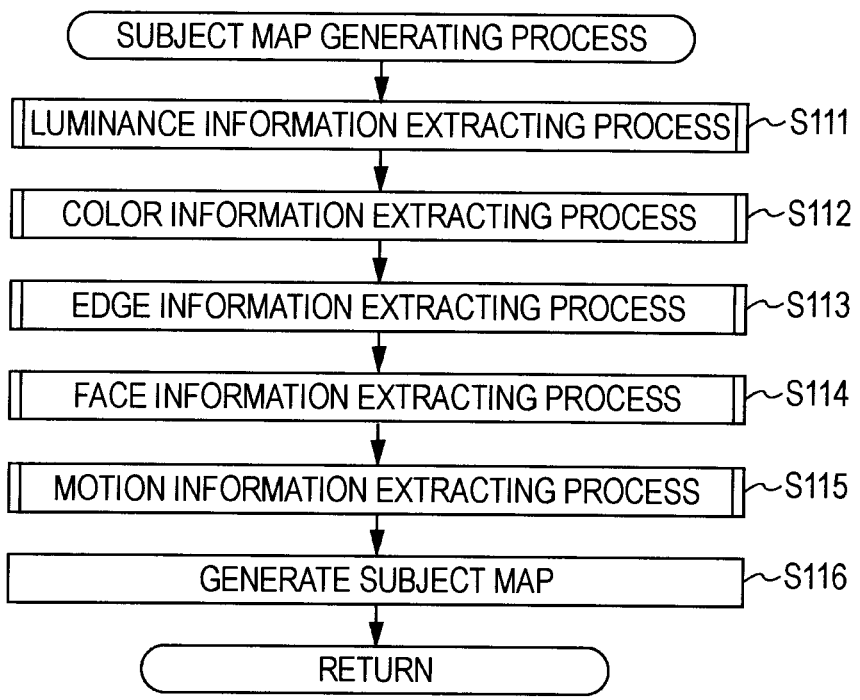
FIG. 20 is a flowchart of an exemplary subject map generating process.

Processes corresponding to the processes performed in steps S111 to S115 shown in FIG. 20 are described next with reference to the flowcharts shown in FIGS. 21 to 25.

An exemplary luminance information extracting process corresponding to the process performed in step S111 shown in FIG. 20 is described first with reference to the flowchart shown in FIG. 21.

In step S151, the luminance image generating unit 151 generates a luminance image using the input image supplied from the acquiring unit 22 and supplies the generated luminance image to the pyramid image generating unit 152. For example, the luminance image generating unit 151 multiplies each of the values of R, G, and B components of a pixel of the input image by a predetermined coefficient for the corresponding component and defines the sum of the resulting values of R, G, and B components as the pixel value of a pixel of a luminance image located at a position the same as that of the pixel of the input image. That is, the luminance component of a component signal formed from a luminance component (Y) and color difference components (Cb, Cr) can be obtained. Note that the average value of the values of R, G, and B components of a pixel may be used as the pixel value of a pixel of the luminance image.

In step S152, the pyramid image generating unit 152 generates a pyramid image for each of the layers from the level L1 to the level L8 using the luminance image supplied from the luminance image generating unit 151 and supplies the generated pyramid image to the difference computing unit 153.

In step S153, the difference computing unit 153 generates a difference image using the pyramid image supplied from the pyramid image generating unit 152 and normalizes the difference image. Thereafter, the difference computing unit 153 supplies the normalized difference image to the luminance information map generating unit 154. The normalization is performed so that the pixel value of a pixel of the difference image ranges between 0 and 255, for example.

More specifically, among the images of the luminance pyramid image in all layers, the difference computing unit 153 computes a difference between the images in the layers of the levels L6 and L3, a difference between the images in the layers of the levels L7 and L3, a difference between the images in the layers of the levels L7 and L4, a difference between the images in the layers of the levels L8 and L4, and a difference between the images in the layers of the levels L8 and L5. Thus, five luminance difference images can be obtained in total.

For example, when the difference image between the pyramid images in the layers of the levels L6 and L3 is generated, the pyramid image of the level L6 is upconverted so as to have a size that is the same as that of the pyramid image of the level L3. That is, the pixel value of a pixel of the pyramid image of the level L6 to be upconverted is used as the pixel value of each of a number of pixels neighboring that pixel and corresponding to that pixel. Subsequently, a difference between the pixel value a pixel of the pyramid image of the level L6 and the pixel value a pixel of the pyramid image of the level L3 located at the same position is computed. The difference is used as the pixel value of a pixel of the difference image.

Such a process of generating a difference image is equivalent to a process of performing a filtering process on the luminance image using a bandpass filter and extracting predetermined frequency components from the luminance image. The pixel value of a pixel of the difference image obtained through such a process indicates a difference between the luminance values of the pyramid images of different levels, that is, a difference between the luminance value of a given pixel of the input image and the average value of the luminance values in the vicinity of the pixel.

In general, a region of an image having luminance significantly different from the luminance in the vicinity of the region is an eye catching region. Accordingly, it is highly likely that the region is a subject region. Therefore, in each of the difference images, the pixels having larger pixel values indicate a region having a higher possibility of being a subject region.

In step S154, the luminance information map generating unit 154 generates a luminance information map using the difference images supplied from the difference computing unit 153 and supplies the generated luminance information map to the subject map generating unit 126. After the luminance information map generating unit 154 supplies the luminance information map to the subject map generating unit 126, the luminance information extracting process is completed, and the processing proceeds to step S112 shown in FIG. 20.

For example, the luminance information map generating unit 154 weights and sums the five supplied difference images using difference weights Wa, which are predefined weights assigned to the individual difference images, and generates a single image. That is, the pixel value of each of the pixels of each of the difference images located at the same position is multiplied by the corresponding difference weight Wa, and the sum of the pixel values multiplied by the difference weights Wa is computed.

Note that when the luminance information map is generated, the difference images are upconverted so as to have the same size.

In this way, the luminance information extracting unit 121 computes the luminance image from the input image and generates a luminance map using the luminance image. In the luminance information extracting unit 121, a difference between the luminance value of each region of the input image and the average value of the luminance values of regions in the vicinity of the region is extracted as a feature. Thereafter, a luminance information map indicating the feature is generated. By using the luminance information map generated in this manner, a region of the input image having a significant luminance difference, that is, a region that draws the attention of a viewer who glances at the input image can be easily detected.

Description of Color Information Extracting Process

An exemplary color information extracting process corresponding to the process performed in step S112 shown in FIG. 20 is described next with reference to the flowchart shown in FIG. 22.

In step S181, the RG difference image generating unit 181 generates an RG difference image using the input image supplied from the acquiring unit 22 and supplies the generated RG difference image to the pyramid image generating unit 183.

In step S182, the BY difference image generating unit 182 generates a BY difference image using the input image supplied from the acquiring unit 22 and supplies the generated BY difference image to the pyramid image generating unit 184.

In step S183, the pyramid image generating unit 183 and the pyramid image generating unit 184 generates a pyramid image using the RG difference image supplied from the RG difference image generating unit 181 and the BY difference image supplied from the BY difference image generating unit 182.

For example, the pyramid image generating unit 183 generates a plurality of RG difference images having different resolutions and, thus, generates a pyramid image having the layers of the level L1 to the level L8. Thereafter, the pyramid image generating unit 183 supplies the generated pyramid image to the difference computing unit 185. Similarly, the pyramid image generating unit 184 generates a plurality of BY difference images having different resolutions and, thus, generates a pyramid image having the layers of the level L1 to the level L8. Thereafter, the pyramid image generating unit 184 supplies the generated pyramid image to the difference computing unit 186.

In step S184, the difference computing unit 185 and the difference computing unit 186 generate difference images using the pyramid images supplied from the pyramid image generating unit 183 and the pyramid image generating unit 184, normalize the difference images, and supply the normalized difference images to the color information map generating unit 187 and the color information map generating unit 188, respectively. In the normalizing process of the difference images, the pixel values of the pixels are normalized so that the pixel value of each of the pixels ranges between 0 and 255.

For example, among the images of the RG difference pyramid image in all layers, the difference computing unit 185 computes a difference between the images in the layers of the levels L6 and L3, a difference between the images in the layers of the levels L7 and L3, a difference between the images in the layers of the levels L7 and L4, a difference between the images in the layers of the levels L8 and L4, and a difference between the images in the layers of the levels L8 and L5. Thus, five RG difference images can be obtained in total.

Similarly, among the images of the BY difference pyramid image in all layers, the difference computing unit 186 computes a difference between the images in the layers of the levels L6 and L3, a difference between the images in the layers of the levels L7 and L3, a difference between the images in the layers of the levels L7 and L4, a difference between the images in the layers of the levels L8 and L4, and a difference between the images in the layers of the levels L8 and L5. Thus, five BY difference images can be obtained in total.

Such a process of generating a difference image is equivalent to a process of performing a filtering process on the RG difference image or BY difference image using a bandpass filter and extracting predetermined frequency components from the RG difference image or BY difference image. The pixel value of a pixel of the difference image obtained through such a process indicates a difference between components of a particular color of the pyramid images of different levels, that is, a difference between the component of a particular color of a given pixel of the input image and the average value of the components of the color in the vicinity of the pixel.

In general, a region of an image having a noticeable color as compared with a color in the vicinity of the region is an eye catching region. Accordingly, it is highly likely that the region is a subject region. Therefore, in each of the difference images, the pixels having larger pixel values indicate a region having a higher possibility of being a subject region.

In step S185, the color information map generating unit 187 and the color information map generating unit 188 generate color information maps using the difference images supplied from the difference computing unit 185 and the difference computing unit 186, respectively, and supply the generated color information maps to the subject map generating unit 126.

For example, the color information map generating unit 187 weights and sums the five RG difference images supplied from the difference computing unit 185 using difference weights Wa, which are predefined weights assigned to the individual difference images. Thus, a color information map in terms of an RG difference is generated.

Similarly, the color information map generating unit 188 weights and sums the five supplied BY difference images supplied from the difference computing unit 186 using difference weights Wa, which are predefined weights assigned to the individual difference images. Thus, a color information map in terms of a BY difference is generated. Note that when the color information map is generated, the difference images are upconverted so as to have the same size.

After the color information map generating unit 187 and the color information map generating unit 188 supply the color information maps in terms of an RG difference and a BY difference obtained in the above-described manner to the subject map generating unit 126, the color information extracting process is completed, and the processing proceeds to step S113 shown in FIG. 20.

In this way, the color information extracting unit 122 computes a difference image of a particular color component from the input image and generates a color information map using the difference image. That is, in the color information extracting unit 122, a difference between a component of a predetermined color of each region of the input image and the average value of average component of the predetermined color of regions in the vicinity of the region is extracted as a feature. Thereafter, a color information map indicating the feature is generated. By using the color information map generated in this manner, a region of the input image having a significant color difference, that is, a region that attracts attention of a viewer who has a glance at the input image can be easily detected.

While the description above has been made with reference to the color information extracting unit 122 that extracts a difference between an R (red) component and a G (green) component and a difference between a B (blue) component and a Y (yellow) component, the color information extracting unit 122 may extract, for example, a color difference component Cr and a color difference component Cb. Note that a color difference component Cr is a difference between an R component and the luminance component, and a color difference component Cb is a difference between a B component and the luminance component.

Description of Edge Information Extracting Process

Figure 23:
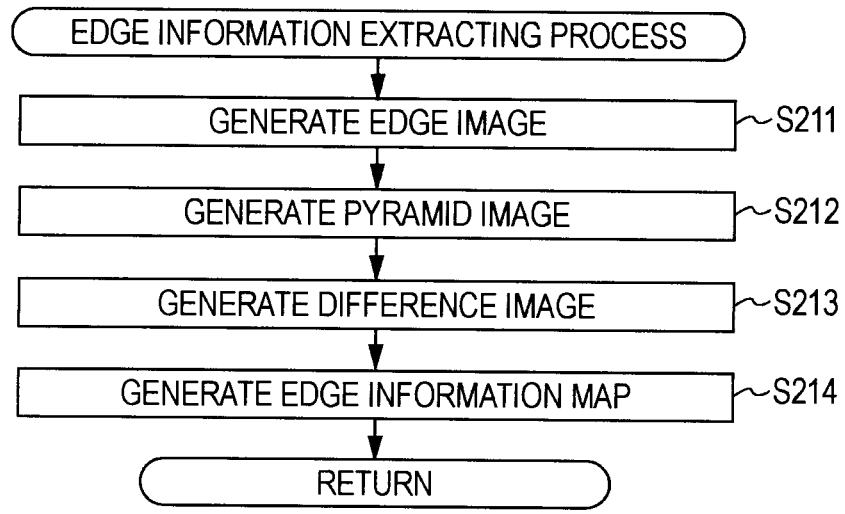
FIG. 23 is a flowchart of an exemplary edge information extracting process.

FIG. 23 is a flowchart of an exemplary edge information extracting process corresponding to the process performed in step S113 shown in FIG. 20. The edge information extracting process is described next.

In step S211, the units from the edge image generating unit 211 to the edge image generating unit 214 perform a filtering process using a Gabor Filter on the input image supplied from the acquiring unit 22 and generate edge images including pixels having pixel values representing an edge strength in directions of 0 degree, 45 degrees, 90 degrees, and 135 degrees, respectively. Thereafter, the edge image generating units 211 to 214 supply the generated edge images to the pyramid image generating units 215 to 218, respectively.

In step S212, the units from the pyramid image generating unit 215 to the pyramid image generating unit 218 generate a pyramid image using the edge images supplied the units from the edge image generating unit 211 to the edge image generating unit 214 and supply the pyramid image to the units from the difference computing unit 219 to the difference computing unit 222.

For example, the pyramid image generating unit 215 generates a plurality of edge images having different resolutions in the 0-degree direction and generates a pyramid image having layers of the level L1 to the level L8. Thereafter, the pyramid image generating unit 215 supplies the generated pyramid image to the difference computing unit 219. Similarly, the pyramid image generating unit 216 to the pyramid image generating unit 218 generate pyramid images each having layers of the level L1 to the level L8 and supply the generated pyramid images to the difference computing unit 220 to the difference computing unit 222, respectively.

In step S213, the difference computing units 219 to 222 generate difference images using the pyramid images supplied from the pyramid image generating units 215 to 218 and normalize the difference images. Thereafter, the difference computing units 219 to 222 supply the normalized difference images to the edge information map generating units 223 to 226, respectively. The normalization of a difference image is performed so that the pixel value of a pixel of the difference image ranges between 0 and 255, for example.

For example, among the images in all layers of the pyramid image for the 0-degree edge direction supplied from the pyramid image generating unit 215, the difference computing unit 219 computes a difference between the images in the layers of the levels L6 and L3, a difference between the images in the layers of the levels L7 and L3, a difference between the images in the layers of the levels L7 and L4, a difference between the images in the layers of the levels L8 and L4, and a difference between the images in the layers of the levels L8 and L5. Thus, five edge difference images can be obtained in total.

Similarly, among the images in all layers of the supplied pyramid image, each of the difference computing units 220 to 222 computes a difference between the images in the layers of the levels L6 and L3, a difference between the images in the layers of the levels L7 and L3, a difference between the images in the layers of the levels L7 and L4, a difference between the images in the layers of the levels L8 and L4, and a difference between the images in the layers of the levels L8 and L5. Thus, five difference images can be obtained in total for each of the edge directions.

Such a process of generating a difference image is equivalent to a process of performing a filtering process on the edge image using a bandpass filter and extracting predetermined frequency components from the edge image. The pixel value of a pixel of the difference image obtained through such a process indicates a difference between the edge strengths of the pyramid images of different levels, that is, a difference between the edge strength of a given position of the input image and the average value of the edge strengths in the vicinity of the position.

In general, a region of an image having an edge strength higher than the edge strengths in the vicinity of the region is an eye catching region. Accordingly, it is highly likely that the region is a subject region. Therefore, in each of the difference images, the pixels having larger pixel values indicate a region having a higher possibility of being a subject region.

In step S214, the edge information map generating units 223 to 226 generate edge information maps for the different directions using the difference images supplied from the difference computing units 219 to 222, respectively, and supply the generated edge information maps to the subject map generating unit 126.

For example, the edge information map generating unit 223 weight-sums the difference images supplied from the difference computing unit 219 using difference weights Wa, which are predefined weights assigned to the individual difference images, and generates an edge information map for the 0-degree direction.

Similarly, the edge information map generating units 224 to 226 weight-sum the difference images supplied from the difference computing units 220 to 222 using the difference weights Wa and generate edge information maps for the 45-degree direction, the 90-degree direction, and 135-degree direction, respectively. Note that when the edge information map is generated, the difference images are upconverted so as to have the same size.

After the edge information map generating units 223 to 226 supply the four edge information maps generated for the different directions in this manner to the subject map generating unit 126, the edge information extracting process is completed, and the processing proceeds to step S114 shown in FIG. 20.

In this way, the edge information extracting unit 123 computes the edge difference image for a particular direction from the input image and generates an edge information map using the difference image. That is, in the edge information extracting unit 123, a difference between an edge strength of each region of the input image in the particular direction in a difference and the average value of the edge strengths of regions in the vicinity of the region in the particular direction is extracted as a feature. Thereafter, an edge information map indicating the feature is generated. By using the edge information maps generated for the different directions in this manner, a region of the input image having a higher edge strength than regions in the vicinity of the region in the particular direction, that is, a region that draws the attention of a viewer who glances at the input image, can be easily detected.

While the above-described description has been made with reference to a Gabor filter used for extracting an edge, a different edge extraction filter, such as a Sobel filter or a Roberts filter, may be used in place of a Gabor filter.

Description of Face Information Extracting Process

Figure 24:
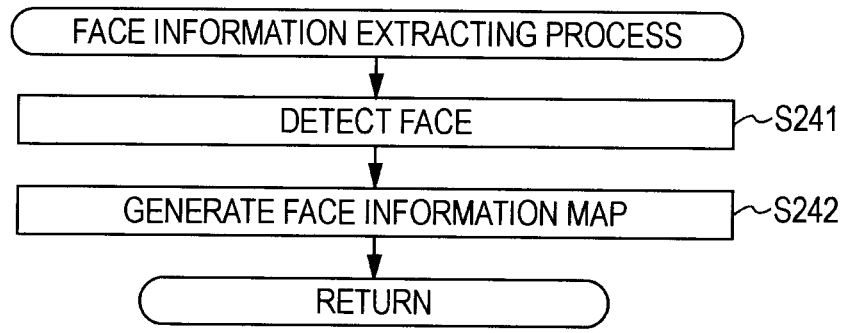
FIG. 24 is a flowchart of an exemplary face information extracting process.

An exemplary face information extracting process corresponding to the process performed in step S114 shown in FIG. 20 is described next with reference to the flowchart shown in FIG. 24.

In step S241, the face detecting unit 251 detects a region of the face of a person from the input image supplied from the acquiring unit 22 and supplies the detection result to the face information map generating unit 252. For example, the face detecting unit 251 performs a filtering process on the input image using a Gabor filter and detects characteristic regions of a person, such as regions of the eyes, mouth, and nose, from the input image. Thus, the face detecting unit 251 detects the region of a face from the input image.

In step S242, the face information map generating unit 252 generates a face information map using the result of detection supplied from the face detecting unit 251 and supplies the generated face information map to the subject map generating unit 126.

For example, suppose that, as the result of face detection, a plurality of rectangular regions (hereinafter referred to as "candidate regions") that may include a face are detected from the input image. At that time, the plurality of candidate regions are detected in the vicinity of a certain position of the input image, and some of the candidate images may partially overlap with each other. That is, for example, when one of the face regions is detected in the input image and if a plurality of candidate regions each including the face are obtained, the candidate regions partially overlap with each other.

The face information map generating unit 252 generates a detection image having the size that is the same as the size of the input image for each of the candidate images obtained through the face detection. In this detection image, the pixel values of pixels of the candidate region to be processed are set to values greater than those of a region other than the candidate region.

In addition, in terms of the pixel values of the pixels of the detection image, the pixels located at the same position as that of the pixel of a candidate region that is determined to include a person's face more likely has a higher pixel value. The face information map generating unit 252 sums the detection images obtained in this manner into a single image. Thereafter, the face information map generating unit 252 normalizes the generated image and uses the image as a face information map. Accordingly, in the face information map, the pixels located in the region corresponding to the region in which a plurality of candidate regions partially overlap with each other have large pixel values and, therefore, it is highly likely that the region includes the face. Note that the normalization is performed so that each of the pixel value of a pixel of the face information map ranges between 0 and 255.

After the face information map is generated, the face information extracting process is completed, and the processing proceeds to step S115 shown in FIG. 20.

In this way, the face information extracting unit 124 detects a face from the input image and generates a face information map using the result of detection. By using the face information map obtained in this manner, a region of a person's face serving as a subject can be easily detected.

Description of Motion Information Extracting Process

Figure 25:
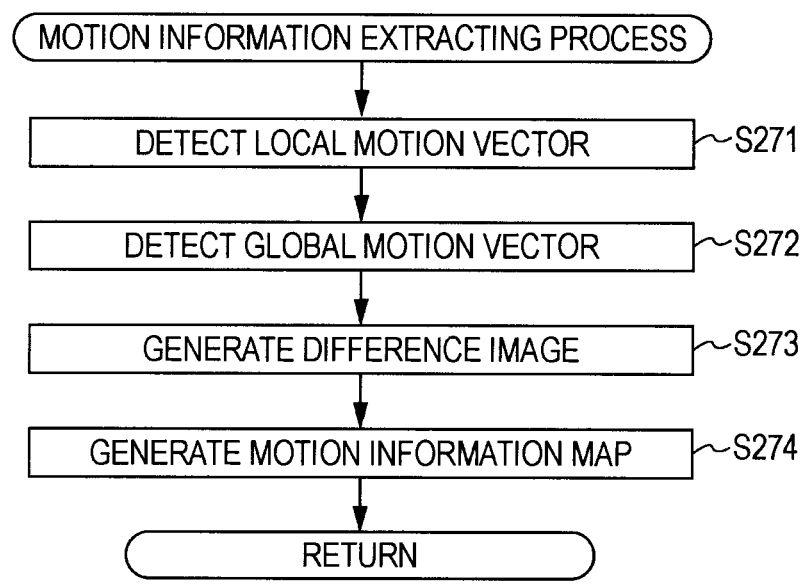
FIG. 25 is a flowchart of an exemplary motion information extracting process.

An exemplary motion information extracting process corresponding to the process performed in step S115 shown in FIG. 20 is described next with reference to the flowchart shown in FIG. 25.

In step S271, the local motion vector extracting unit 281 detects a local motion vector of each of the pixels of the input image supplied from the acquiring unit 22 using, for example, a gradient method. Thereafter, the local motion vector extracting unit 281 supplies the local vector to the difference computing unit 283.

In step S272, the global motion vector extracting unit 282 detects a global motion vector using the input image supplied from the acquiring unit 22 and supplies the global motion vector to the difference computing unit 283.

In step S273, the difference computing unit 283 computes the absolute value of a difference between the local motion vector supplied from the local motion vector extracting unit 281 and the global motion vector supplied from the global motion vector extracting unit 282. Thus, the difference computing unit 283 generates a motion difference image. Thereafter, the difference computing unit 283 supplies the generated motion difference image to the motion information map generating unit 284.

In step S274, the motion information map generating unit 284 normalizes the motion difference image supplied from the difference computing unit 283 and generates a motion information map. Thereafter, the difference computing unit 283 supplies the motion information map to the subject map generating unit 126. Note that the normalization is performed so that each of the pixel value of a pixel ranges between 0 and 255. After the motion information map is generated, the motion information extracting process is completed, and the processing proceeds to step S116 shown in FIG. 20.

In this way, the motion information extracting unit 125 detects a motion from the input image and generates a motion information map using the result of detection. By using the motion information map, a region of a moving object in the input image can be easily detected. The region of a moving object in the input image is a region that attracts attention of a viewer who has a glance at the input image. Accordingly, it is highly likely that the region represents the subject.

As shown in FIG. 4, the subject extracting unit 92 generates a variety of information maps in the above-described manner and generates a subject map using the information maps.

Description of Edge Points Computing Process

Figure 27:
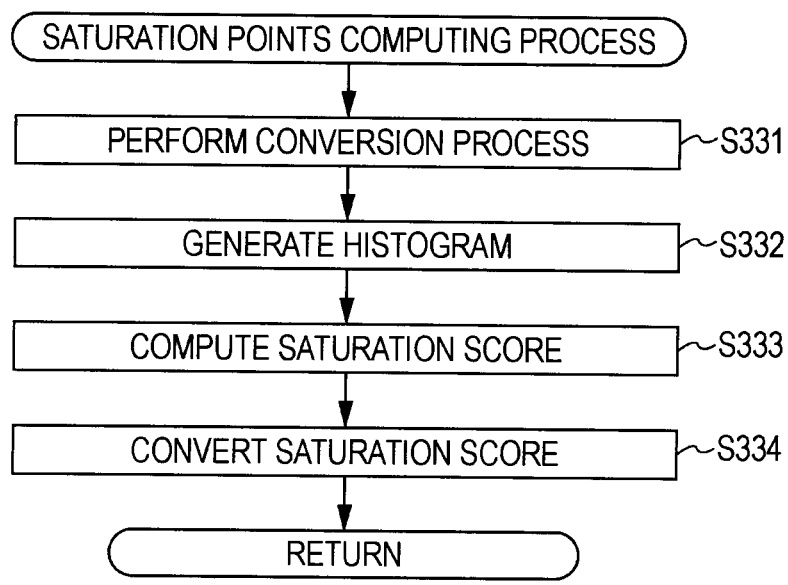
FIG. 27 is a flowchart of an exemplary saturation points computing process.
Figure 28:
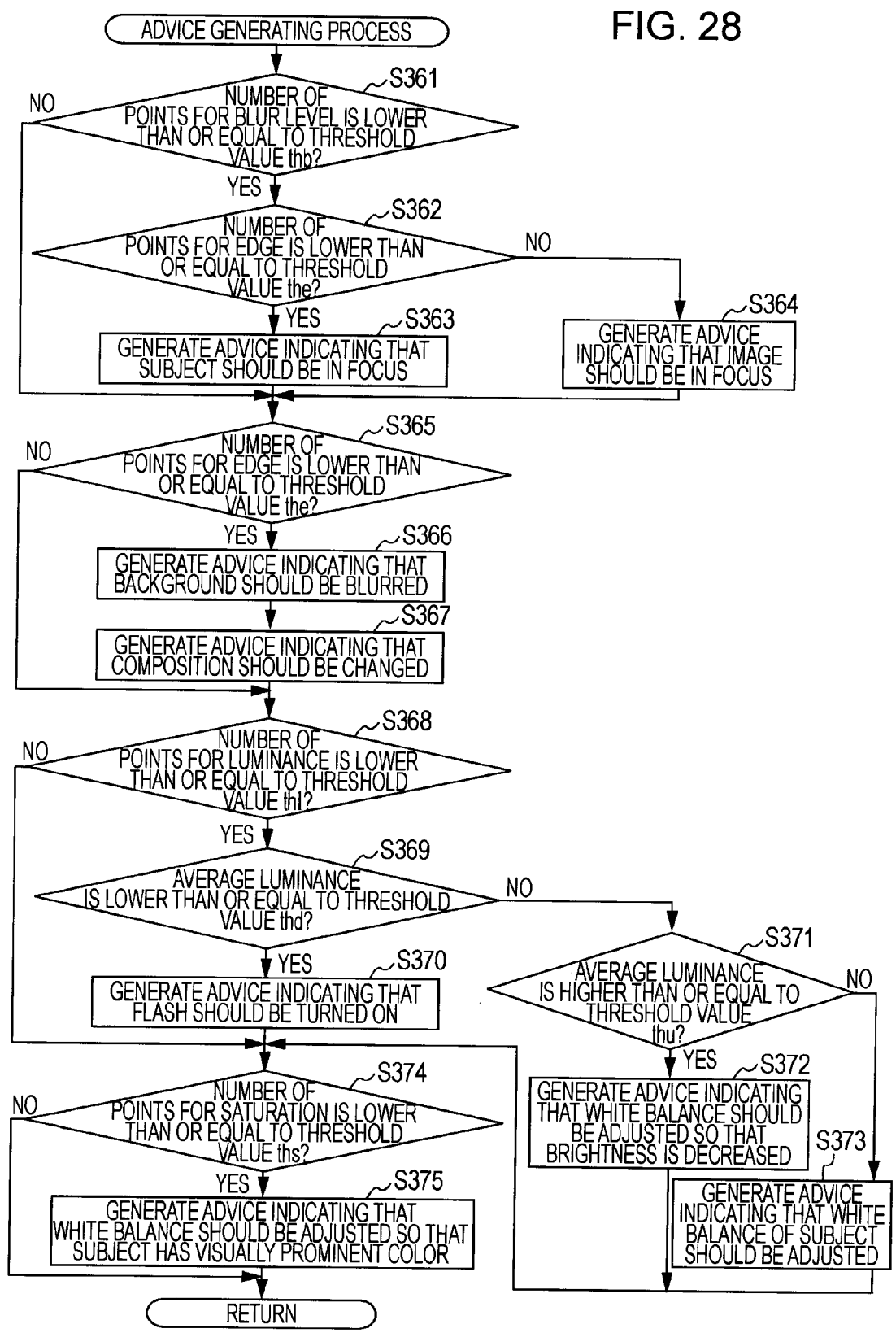
FIG. 28 is a flowchart of an exemplary advice generating process.

Exemplary edge points computing process, saturation points computing process, and advice generating process corresponding to the processes performed in steps S14 to S16 shown in FIG. 12 are described below with reference to FIGS. 26 to 28.

Figure 26:
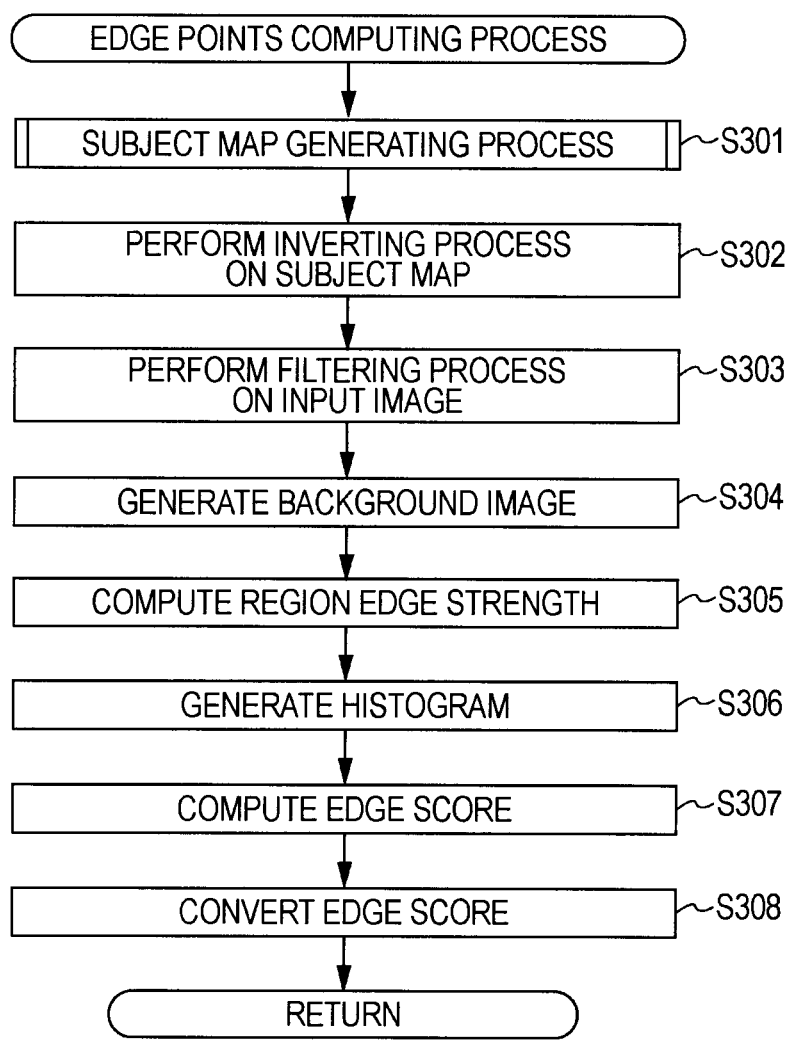
FIG. 26 is a flowchart of an exemplary edge points computing process.

The edge points computing process corresponding to the processes performed in step S14 shown in FIG. 12 is described first with reference to the flowchart shown in FIG. 26. This edge points computing process is performed by the edge points computing unit 25 shown in FIG. 10.

In step S301, the subject extracting unit 311 performs a subject map generating process and generates a subject map from the input image supplied from the acquiring unit 22 and supplies the subject map to the inverting unit 312. Note that since the subject map generating process is similar to the subject map generating process illustrated in FIG. 20, the description thereof is not repeated.

In step S302, the inverting unit 312 performs an inversion process on the subject map supplied from the subject extracting unit 311 and supplies the inverted subject map to the multiplier unit 315. That is, in the subject map, the pixel value "1" of a pixel is changed to "0", while the pixel value "0" of a pixel is changed to "1". Accordingly, by using the inverted subject map, a background portion of the input image can be extracted.

In step S303, the filter processing unit 313 performs a filtering process using a Laplacian filter on the input image supplied from the acquiring unit 22 and generates a Laplacian image and supplies the Laplacian image to the normalization unit 314. The normalization unit 314 normalizes the Laplacian image supplied from the filter processing unit 313 and supplies the normalized Laplacian image to the multiplier unit 315.

In step S304, the multiplier unit 315 multiplies the Laplacian image supplied from the normalization unit 314 by the inverted subject map supplied from the inverting unit 312 and generates a subject image. Thereafter, the multiplier unit 315 supplies the generated subject image to the region edge strength computing unit 316 and the histogram generating unit 317. That is, the multiplier unit 315 computes the product of the pixel value of each of the pixels of the Laplacian image and the pixel value of the pixel of the inverted subject map located at the same position and uses the product as the pixel value of a pixel of the background image. The background image acquired in this manner is an image indicating the edge strengths of a portion other than the subject, that is, the background portion.

In step S305, the region edge strength computing unit 316 computes the edge strengths of the upper edge region, lower end region, left end region, and right edge region using the background image supplied from the multiplier unit 315 and supplies the edge strengths of each of the regions to the conversion unit 319. For example, the region edge strength computing unit 316 computes the sum of the pixel values of the pixels of the upper edge region of the background image and uses the sum as the region edge strength of the upper edge region.

In step S306, the histogram generating unit 317 generates a histogram using the background image supplied from the multiplier unit 315. The histogram indicates the complexity of the edge in the background portion of the input image.

That is, the histogram generating unit 317 performs threshold value processing on the background image. More specifically, among the pixels of the subject image, a pixel having a pixel value higher than or equal to a threshold value continues to have the pixel value. However, a pixel having a pixel value lower than the threshold value is changed to 0.

Subsequently, the histogram generating unit 317 generates an edge histogram that uses a range of the pixel values of pixels of the background image, that is, a range of the edge strengths as a bin. Thereafter, the histogram generating unit 317 supplies the generated edge histogram to the score computing unit 318.

In step S307, the score computing unit 318 computes an edge score using the histogram supplied from the histogram generating unit 317 and supplies the edge score to the conversion unit 319.

For example, suppose that the pixel value of the background image subjected to the threshold value processing is in the range of 0 to 1. Then, the score computing unit 318 selects, from among one or more bins included in the range from a pixel value (an edge strength) of 0.1 to a pixel value of 0.2, a bin having the highest frequency value and extracts that value as the highest frequency value Ma. That is, from among the bins having a representative value between 0.1 to 0.2, a bin having the highest frequency value is selected, and the highest frequency value is used as the highest frequency value Ma.

In addition, the score computing unit 318 selects, from among one or more bins included in the range from a pixel value (edge strength) of 0.8 to a pixel value of 0.9, a bin having the lowest frequency value and extracts that value as the lowest frequency value Mb. That is, from among the bins having a representative value between 0.8 to 0.9, a bin having the lowest frequency value is selected, and the lowest frequency value is used as the lowest frequency value Mb.

Subsequently, the score computing unit 318 subtracts the lowest frequency value Mb from the highest frequency value Ma and uses the resulting value as an edge score. The edge score obtained in this manner represents a difference between the number of pixels having small edge strengths and the number of pixels having large edge strengths in the background portion of the input image, that is, the complexity of the edge of the background portion.

In general, in amateur images, the edge of the background portion is complex and, therefore, the highest frequency value Ma tends to increase while the lowest frequency value Mb tends to decrease. That is, it is highly likely that the edge score of an image that is similar to an amateur image increases. In contrast, in professional images, the edge of the background portion is simple, that is, the number of pixels having large edge strengths is small and, therefore, the highest frequency value Ma and the lowest frequency value Mb tend to decrease. That is, it is highly likely that the edge score of an image that is similar to a professional image decreases. Accordingly, as the edge score decreases, the input image is more attractive.

In step S308, the conversion unit 319 converts the edge score supplied from the score computing unit 318 into the number of points for an edge using a prestored conversion table. For example, the conversion unit 319 includes a conversion table that is generated in the same manner as for the conversion table stored in the conversion unit 69 shown in FIG. 2. The conversion unit 319 converts the edge score into the number of points for an edge using the conversion table. As the edge score decreases, the complexity of the edge of the background portion decreases and, therefore, the input image is more similar to a professional image. Accordingly, as the edge score decreases, the edge score is converted into a higher number of points.

After converting the edge score into the number of points for edges, the conversion unit 319 supplies the obtained number of points for edges and the region edge strength supplied from the region edge strength computing unit 316 to the advice generating unit 27. Thereafter, the edge points computing process is completed, and the processing proceeds to step S15 shown in FIG. 12.

In this way, the edge points computing unit 25 extracts a background portion from the input image and computes the edge score indicating the complexity of the edge strength of the background portion using the edge strength of the background portion. Thereafter, the edge points computing unit 25 converts the edge score into a number of points for edges using the conversion table.

As described above, by processing only the background portion and computing the number of points for an edge, the attractiveness of the input image can be more correctly evaluated.

That is, amateur images tend to include a background portion having complex edges, while professional images tend to include a background portion having simple edges. Accordingly, in order to use such tendency, an edge score that indicates the complexity of the edge in only the background portion is computed, and the edge score is converted into the number of points for edges. Thus, the attractiveness of the input image can be more simply and correctly evaluated regardless of the complexity of the edge in the subject portion.

Description of Saturation Points Computing Process

The saturation points computing process corresponding to the processes performed in step S15 shown in FIG. 12 is described next with reference to the flowchart shown in FIG. 27.

In step S331, the conversion unit 341 converts the input image supplied from the acquiring unit 22 into an input image formed from the value of components of H (hue), S (saturation), and V (value) and supplies the converted input image to the histogram generating unit 342.

In step S332, the histogram generating unit 342 generates a histogram of the components of saturation using the input image supplied from the conversion unit 341 and supplies the generated histogram to the score computing unit 343. For example, the histogram generating unit 342 extracts, from among the pixels of the input image, pixels having an H (hue) component higher than or equal to a predetermined threshold value th1 and a V (value) component higher than or equal to a predetermined threshold value th2. Thereafter, the histogram generating unit 342 generates a histogram having a bin indicating the range of the values of the S (saturation) component using the extracted pixels.

In step S333, the score computing unit 343 computes a saturation score using the histogram supplied from the histogram generating unit 342 and supplies the saturation score to the conversion unit 344.

For example, the score computing unit 343 performs GMM (Gaussian mixture model) approximation on the saturation histogram and computes the importance, average value, and variance of one or more distributions. As used herein, the term "distribution" refers to a portion of the overall distribution curve obtained from the approximation that has a peak.

The score computing unit 343 uses, as the saturation score, each of the variance and the average value of the most important distribution among the distributions. The saturation scores obtained in this manner represent the average value and the variance of the saturation components of the entire input image. By using the average value and the variance value, it can be determined whether the input image resembles a professional image or an amateur image. Accordingly, by using the saturation score, the attractiveness of the input image can be evaluated.

In step S334, the conversion unit 344 converts the saturation score supplied from the score computing unit 343 into the number of points for saturation using a prestored conversion table.

For example, the conversion unit 344 prestores a conversion table generated in the same manner as for the conversion table stored in the conversion unit 69 shown in FIG. 2 for each of the average value and the variance serving as the saturation score and converts the saturation score into a number of points using the conversion tables. Thus, a number of points for the average value and a number of points for the variance can be obtained.

For example, the saturation score is converted so that the number of points given for the average value and the number of points given for the variance have a higher value as the average value and variance of the saturation components of the input image are more similar to those of a professional image. That is, when the average value of the saturation components and the variance of the saturation components are used as the index of evaluation, the input image is more similar to a professional image (i.e., the input image is more attractive) as the number of points given to the average value and the number of points given to the variance have higher values.

After the number of points for the saturation is computed, the conversion unit 344 supplies the computed number of points for the saturation to the advice generating unit 27. Thereafter, the saturation points computing process is completed, and the processing proceeds to step S16 shown in FIG. 12.

As described above, the color saturation points computing unit 26 computes the average value and the variance of the saturation values as a saturation score and converts the saturation score into the number of points for the saturation. By computing the average value and the variance of the saturation values in the entire input image and computing the number of points for the saturation, the attractiveness of the input image can be further correctly evaluated.

That is, when the attractiveness of the input image is evaluated using the saturation as an indicator, it is necessary that the entire image be the target of evaluation. Accordingly, by computing the average value and the variance of the saturation values in the entire input image, the attractiveness of the input image can be further correctly evaluated.

Description of Advice Generating Process

The advice generating process corresponding to the processes performed in step S16 shown in FIG. 12 is described next with reference to the flowchart shown in FIG. 28.

In step S361, the advice generating unit 27 determines whether the number of points for the blur level supplied from the blur level points computing unit 23 is less than or equal to a predetermined threshold value thb.

If, in step S361, it is determined that the number of points for the blur level is not less than or equal to the predetermined threshold value thb, the processing proceeds to step S365.

The number of points for the blur level increases as the blur level for the entire input image decreases. Accordingly, if the number of points for the blur level is higher than the predetermined threshold value thb, the input image is not entirely blurred. Accordingly, it is not necessary to decrease the blur of the input image. Therefore, an advice message for increasing the score determined by the blur level is not output.

However, if, in step S361, it is determined that the number of points for the blur level is less than or equal to the predetermined threshold value thb, the advice generating unit 27, in step S362, determines whether the edge score supplied from the edge points computing unit 25 is lower than or equal to a predetermined threshold value the.

If, in step S362, it is determined that the edge score is lower than or equal to the predetermined threshold value, the advice generating unit 27, in step S363, generates an advice message that the user should focus on the subject and supplies the advice message to the display control unit 28.

As the edge in the background portion of the input image becomes more complicated, the edge score decreases. Accordingly, if the edge score is lower than a certain value, the background portion of the input image is in focus. That is, the foreground of the input image (the subject) is blurred, and the background portion of the input image is in focus.

Accordingly, when the blur level score is lower than or equal to the predetermined threshold value thb and if the edge score is lower than or equal to the predetermined threshold value the, the background portion is somewhat in focus although the input image is somewhat blurred overall.

Therefore, in such a case, in order to increase the blur level score, the advice generating unit 27 generates an advice message indicating that the subject should be in focus. By controlling the focus in accordance with this advice, the user can obtain a further attractive image in which the subject is in focus.

However, if, in step S362, it is determined that the edge score is not lower than or equal to the predetermined threshold value the, the advice generating unit 27, in step S364, generates an advice message indicating that the image should be in focus and supplies the advice message to the display control unit 28.

When the blur level score is lower than or equal to the predetermined threshold value thb and if the edge score is higher than the predetermined threshold value the, the entire input image is blurred, and the background portion is also blurred. That is, any point of the input image is not in focus.

Therefore, in such a case, in order to decrease the blur of the input image, the advice generating unit 27 generates an advice message indicating that the image should be in focus. By controlling the focus in accordance with this advice, the user can obtain a further attractive image in which the subject is in focus.

However, if, in step S361, it is determined that the number of points for the blur level is not less than or equal to the predetermined threshold value thb or if, in step S363 or S364, an advice message is generated, the processing proceeds to step S365.

In step S365, the advice generating unit 27 determines whether the number of points for edges supplied from the edge points computing unit 25 is lower than or equal to the predetermined threshold value the.

If, in step S365, it is determined that the number of points for edges is not lower than or equal to the predetermined threshold value the, the processing proceeds to step S368.

As the background portion of the input image becomes simpler, the number of points for edges increases. As the number of points for edges increases, the input image is more similar to a professional image, that is, the input image is more attractive. Accordingly, if the number of points for edges is higher than the predetermined threshold value the, the edge in the background portion of the input image is simple. When the input image is evaluated using the complexity of edges as an indicator, the input image is sufficiently attractive image. Accordingly, it is not necessary to decrease the complexity of the edges of the background of the input image. Thus, an advice message for increasing the number of points in terms of the complexity of edges is not output.

In contrast, if, in step S365, it is determined that the edge score is lower than or equal to the predetermined threshold value the, the advice generating unit 27, in step S366, generates an advice message indicating that the background should be blurred and supplies the advice message to the display control unit 28.

An input image having an edge score lower than or equal to the predetermined threshold value the is an unattractive image including the background image having a complicated edge. Accordingly, in order to increase the attractiveness evaluated using the complexity of the edges of the background as the indicator, the advice generating unit 27 generates an advice message indicating that the background should be blurred. By controlling the focus in accordance with this advice, the user can obtain a further attractive image including a simple background.

In addition, in step S367, the advice generating unit 27 generates, using the region edge strength supplied from the edge points computing unit 25, an advice message indicating that the composition of the input image should be changed as necessary. Thereafter, the advice generating unit 27 supplies the advice message to the display control unit 28.

That is, the advice generating unit 27 compares each of the upper edge region, the lower end region, the left end region, and the right edge region with a predetermined threshold value and outputs an advice message indicating that the composition of the input image should be changed in accordance with the result of the comparison as necessary.

The region edge strength of each of the regions represents the sum of the edge strengths of the pixels in each region of the background image. Accordingly, a region having a higher region edge strength has a more complicated edge of the background image.

For example, if each of the region edge strengths of the left end region and right edge region is higher than the threshold value, a complicated edge is included in the background. Therefore, the advice generating unit 27 generates an advice message indicating that the background should have a simpler composition. More specifically, for example, the advice message "Move closer to the subject" is generated.

If the user captures the image in accordance with the advice, the user can get a composition in which the subject accounts for a large area of the input image and the background is more blurred. Therefore, the user can obtain a further attractive image including a simple background image. That is, in terms of the complexity of edges in the background is used as an indicator of evaluation, a further attractive input image can be obtained.

In addition, for example, if the region edge strength of the left end region is lower than the threshold value and the region edge strength of the right edge region is higher than or equal to the threshold value, the edge in the left end portion of the background in the input image is simple, but the edge in the right edge portion of the background is complicated.

In such a case, the advice generating unit 27 generates an advice message indicating that the composition should be changed in order to simplify the background portion on the right end side of the input image. More specifically, for example, the advice message "Move the camera to the left" is generated. If the user captures the image in accordance with the advice, the user can get a composition in which the edges in the background portion on either side in the input image are simplified. Therefore, the user can obtain a further attractive input image when the complexity of edges in the background is used as an indicator of evaluation.

However, if, in step S365, it is determined that the number of points for an edge is not lower than or equal to the predetermined threshold value the or if, in step S367, an advice message is generated, the processing proceeds to step S368. In step S368, the advice generating unit 27 determines whether the number of points for the luminance supplied from the luminance points computing unit 24 is lower than or equal to a predetermined threshold value th1.

If, in step S368, it is determined that the number of points for the luminance is not lower than or equal to a predetermined threshold value th1, the processing proceeds to step S374.

The number of points for the luminance becomes higher as the luminance distribution of the foreground portion of the input image is more similar to that of a professional image and, therefore, the image is regarded as a more attractive image. Accordingly, if the number of points for the luminance is higher than the predetermined threshold value th1, the luminance distribution of the foreground portion of the input image is similar to a professional image that is widely highly appreciated. When the luminance distribution of the foreground image is used as the indicator of evaluation, the input image is sufficiently attractive. Thus, changing the luminance distribution of the foreground portion of the input image is not necessary, and an advice message for increasing the number of points for the luminance is not output.

However, if, in step S368, it is determined that the number of points for the luminance is lower than or equal to a predetermined threshold value th1, the advice generating unit 27, in step S369, determines whether the average luminance supplied from the luminance points computing unit 24 is lower than or equal to a predetermined threshold value thd.

If, in step S369, it is determined that the average luminance is lower than or equal to the predetermined threshold value thd, the advice generating unit 27, in step S370, generates an advice message indicating that the flash should be turned on and supplies the advice message to the display control unit 28.

When the number of points for the luminance is lower than or equal to the predetermined threshold value th1, the input image has the luminance distribution of the foreground portion that is not similar to that of a professional image. In general, such an input image includes a foreground portion that is too bright or too dark. In addition, the average luminance of an input image that is lower than or equal to the predetermined threshold value thd indicates that the entire input image is dark.

Accordingly, it is highly likely that an input image having a number of points for the luminance that is lower than or equal to the predetermined threshold value th1 and having an average luminance that is lower than or equal to the predetermined threshold value thd is too dark overall (not only foreground portion is dark). Accordingly, in order to increase the brightness of the entire input image, the advice generating unit 27 generates an advice message indicating that the flash should be turned on. By capturing an image in accordance with this advice, at least the foreground portion of the input image can have a sufficient brightness due to the flash. Thus, the user can obtain a further attractive input image when the luminance distribution of the foreground is used as an indicator of evaluation.

However, if, in step S369, it is determined that the average luminance is not lower than or equal to the predetermined threshold value thd, the advice generating unit 27, in step S371, determines whether the average luminance is higher than or equal to a predetermined threshold value thu. Here, the predetermined threshold value thu is greater than the predetermined threshold value thd. The predetermined threshold value thu is used to determine whether the entire input image is too bright or not.

If, in step S371, it is determined that the average luminance is higher than or equal to the predetermined threshold value thu, the advice generating unit 27, in step S372, generates an advice message indicating that the white balance should be adjusted in order to decrease the brightness and supplies the advice message to the display control unit 28.

It is highly likely that an input image having a number of points for the luminance that is lower than or equal to the predetermined threshold value th1 and having an average luminance that is higher than or equal to the predetermined threshold value thu is too bright overall. Accordingly, in order to increase the luminance of the entire input image, the advice generating unit 27 generates an advice message indicating that the white balance should be adjusted. By controlling the white balance in accordance with this advice, the brightness of the entire input image can be decreased. Thus, the user can obtain a further attractive input image when the luminance distribution of the foreground is used as an indicator of evaluation.

However, if, in step S371, it is determined that the average luminance is not higher than or equal to the predetermined threshold value thu, the advice generating unit 27, in step S373, generates an advice message indicating that the white balance of the subject portion should be adjusted and supplies the advice message to the display control unit 28.

It is highly likely that an input image having a number of points for the luminance that is lower than or equal to the predetermined threshold value th1 and having an average luminance that is higher than the predetermined threshold value thd and lower than the predetermined threshold value thu includes a too bright foreground portion or is too dark overall. Accordingly, in order to appropriately adjust the luminance of the foreground portion (i.e., the subject), the advice generating unit 27 generates an advice message indicating that the white balance of the subject portion should be adjusted. By controlling the white balance of the foreground in accordance with this advice, the brightness of the subject in the input image can be set to an appropriate brightness. Thus, the user can obtain a further attractive input image when the luminance distribution of the foreground is used as an indicator of evaluation.

In addition, if, in step S368, it is determined that the number of points for the luminance is not lower than or equal to the predetermined threshold value th1 or if, in step S370, S372, or S373, advice is generated, the processing proceeds to step S374.

In step S374, the advice generating unit 27 determines whether the number of points for the saturation supplied from the color saturation points computing unit 26 is lower than or equal to a predetermined threshold value ths.

More specifically, the advice generating unit 27 determines whether the number of points for the average value of saturation components serving as the number of points for the saturation is lower than or equal to a predetermined threshold value ths1 or the number of points for the variance of saturation components serving as the number of points for the saturation is lower than or equal to a predetermined threshold value ths2.

Subsequently, if at least one of the number of points for the average value and the number of points for the variance is lower than or equal to the predetermined threshold value ths1 or the predetermined threshold value ths2, the advice generating unit 27 determines that the number of points for the saturation is lower than or equal to the predetermined threshold value ths.

If, in step S374, it is determined that the number of points for the saturation is not lower than or equal to the predetermined threshold value ths, the advice generating process is completed and the processing proceeds to step S17 shown in FIG. 12.

The number of points for the saturation increases as the variance and the average value of the saturation components of the input image are similar to those of a professional image. As the number of points for the saturation increases, the entire input image becomes brighter and more attractive. Accordingly, if the number of points for the saturation is higher than the predetermined threshold value ths, the variance and the average value of the saturation components of the input image are similar to those of professional images that are widely praised. That is, when the saturation is used as an indicator of evaluation, the input image is a bright and attractive image. Thus, it is not necessary to increase the brightness of the input image and, therefore, an advice message for increasing the number of points for the saturation is not output.

However, if, in step S374, it is determined that the number of points for the saturation is lower than the predetermined threshold value ths, the advice generating unit 27, in step S375, generates an advice message indicating that the white balance should be adjusted so that the colors of the subject are visually prominent. Thereafter, the advice generating unit 27 supplies the advice message to the display control unit 28.

When the number of points for the saturation is lower than the predetermined threshold value ths, the average value or the variance of the saturation of the input image is not close to that of a professional image. In general, such an input image is washed out and is not vivid overall. Accordingly, the advice generating unit 27 generates an advice message indicating that the white balance should be adjusted so that colors of the entire input image and, in particular, colors of the subject are highly visible. By adjusting the white balance of the subject in accordance with this advice, the colors of the entire input image and, in particular, the colors of the subject can become vivid. Thus, the user can obtain a further attractive input image when the saturation is used as an indicator of evaluation.

Note that in step S375, an advice message indicating that the exposure should be adjusted instead of the white balance in order to increase the brightness of the input image may be output.

After an advice message indicating that the white balance should be adjusted so that the colors of the subject is highly visible, the advice generating process is completed and the processing proceeds to step S17 shown in FIG. 12.

In this way, the advice generating unit 27 outputs a predetermined advice message in accordance with the number of points for each of the features. By outputting an advice message so that the number of points for the feature is further increased in accordance with the amount of the number of points in the above-described manner, the number of points for the feature can be increased. As a result, a more attractive input image can be captured. That is, a more appropriate advice can be presented to the user.

Note that the distribution of a color in the entire input image may be further used as an indicator of evaluation. In such a case, for example, a number of points for the color distribution is computed using, for example, the similarity of the input image to a professional image or an amateur image, and an advice message is output in accordance with the number of points for the color distribution. For example, by using color distribution, advice indicating how the white balance should be adjusted can be given to the user.

The above-described series of processes can be executed not only by hardware but also by software. When the above-described series of processes are executed by software, the programs of the software are installed from a program recording medium into a computer incorporated in dedicated hardware or a computer that can execute a variety of function by installing a variety of programs therein (e.g., a general-purpose personal computer).

Figure 29:
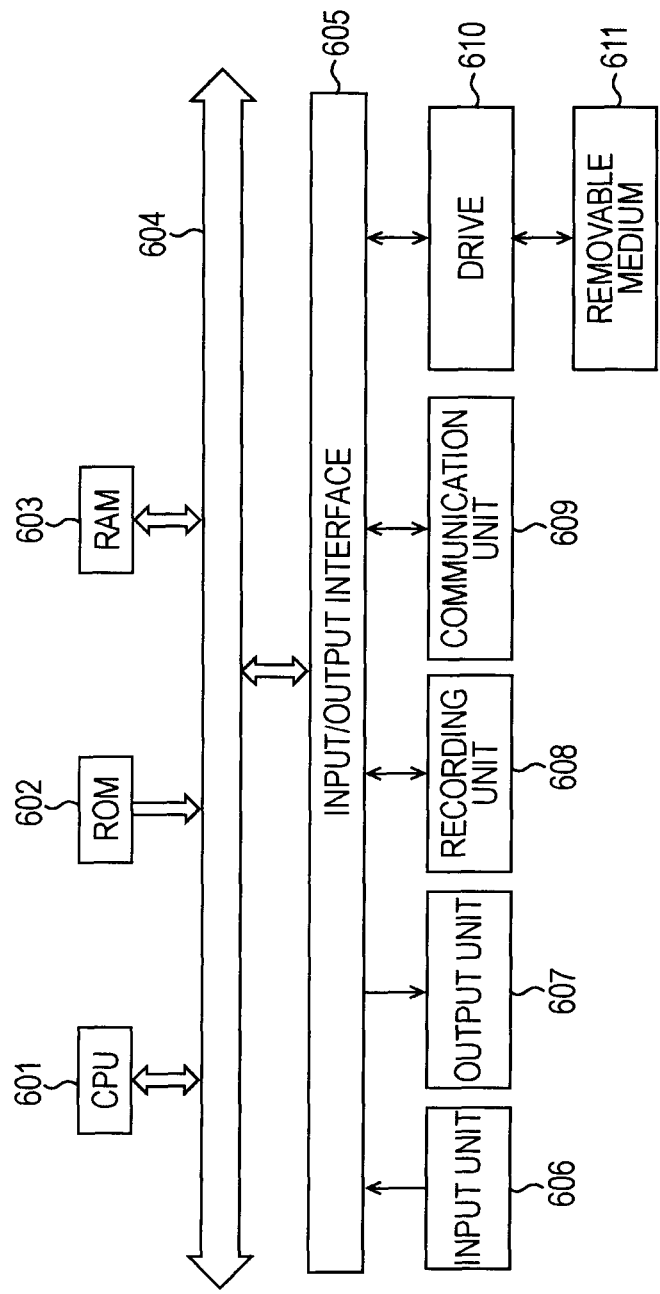
FIG. 29 illustrates an exemplary configuration of a computer.

FIG. 29 is a block diagram of an exemplary hardware configuration of a computer that executes a program and performs the above-described series of processes.

In a computer, a central processing unit (CPU) 601, a read only memory (ROM) 602, and a random access memory (RAM) 603 are connected to one another via a bus 604.

An input/output interface 605 is further connected to the bus 604. The following devices are connected to the input/output interface 605: an input unit 606 including a keyboard, a mouse, and a microphone, an output unit 607 including a display and a speaker, a recording unit 608 including a hard disk and a semiconductor memory, a communication unit 609 including a network interface, and a drive 610 that drives a removable medium 611, such as a magnetic disk, an optical disk, a magnetooptical disk, or a semiconductor memory.

In the computer having the above-described configuration, the CPU 601 loads the program stored in, for example, the recording unit 608 into the RAM 603 via the input/output interface 605 and the bus 604 and executes the loaded program. Thus, the above-described series of processes can be performed.

The program executed by the computer (the CPU 601) is recorded in the removable medium 611, which is a packaged non-transitory computer-readable storage medium including, for example, a magnetic disk (including a flexible disk), an optical disk (e.g., a compact disk-read only memory (CD-ROM) or a digital versatile disc (DVD)), a magnetooptical disk, or a semiconductor memory, and is distributed. Alternatively, the program can be distributed via a wired or wireless transmission medium, such as a local area network, the Internet, or a digital satellite broadcast system.

By mounting the removable medium 611 in the drive 610, the program can be installed in the recording unit 608 via the input/output interface 605. Alternatively, the program may be received by the communication unit 609 via a wired or wireless transmission medium and may be installed in the recording unit 608. Still alternatively, the program may be preinstalled in the ROM 602 or the recording unit 608.

The program executed by the computer may have a structure in which the processes are performed in the order described above or may have a structure in which the processes are executed as necessary (e.g., in parallel or when each of the processes is called).

It should be understood by those skilled in the art that the embodiments of the present invention are not limited to the above-described exemplary embodiments, and various modifications can be made without departing from the spirit and scope of the invention.

What is claimed is:

1. An apparatus for improving the quality of a captured image, comprising:
   a processor; and
   a memory device storing instructions for configuring the processor, wherein the processor is configured by the instructions to:
   combine a plurality of information maps to generate a subject map of a first image;
   separate, based on the subject map, a foreground portion of the first image from a background portion of the first image;
   compute, based on the background portion, a first value representing a background complexity of the first image;
   compute, based on both the foreground and the background portions, and by using a plurality of edge maps with different scales, a second value representing a blurriness of the first image; and
   generate advice for capturing a second image based on both of the first and second computed values.

2. The apparatus of claim 1, wherein the processor is configured by the instructions to compare the first value to a first predetermined threshold, and the advice for capturing the second image is based on a result of the comparison between the first value and the first predetermined threshold.

3. The apparatus of claim 2, wherein the processor is configured by the instructions to compare the second value to a second predetermined threshold, and the advice for capturing the second image is also based on a result of the comparison between the second value and the second predetermined threshold.

4. The apparatus of claim 1, wherein the processor is configured by the instructions to compute a third value representing a third aspect of the quality of the first image, and the advice for capturing the second image is also based on the third value.

5. The apparatus of claim 4, wherein the third value is associated with a luminance of the first image.

6. The apparatus of claim 4, wherein the third value is associated with a color saturation of the first image.

7. The apparatus of claim 4, wherein the processor is configured by the instructions to compute a fourth value representing a fourth aspect of the quality of the first image, and the advice for capturing the second image is also based on the fourth value.

8. The apparatus of claim 1, further including a display unit configured to display the generated advice.

9. The apparatus of claim 8, wherein the generated advice includes text.

10. The apparatus of claim 1, wherein the generated advice includes advice indicating that a portion of the second image should be in focus.

11. The apparatus of claim 1, wherein the generated advice includes advice indicating whether a flash should be turned on.

12. The apparatus of claim 1, wherein the generated advice includes advice indicating how a white balance should be adjusted.

13. The apparatus of claim 1, wherein the subject map is generated using information weights.

14. The apparatus of claim 1, wherein the plurality of information maps each indicate information about a different feature of the first image.

15. The apparatus of claim 1, wherein the plurality of information maps include a face information map, a motion information map, a color information map, a luminance information map, and an edge information map.

16. The apparatus of claim 1, wherein the subject map is used to generate a subject image of the first image.

17. The apparatus of claim 1, wherein the subject map is inverted to generate a background image of the first image.

18. A camera, comprising:
   a processor; and
   a memory device storing instructions for configuring the processor, wherein the processor is configured by the instructions to:
      combine a plurality of information maps to generate a subject map of a first image;
      separate, based on the subject map, a foreground portion of the first image from a background portion of the first image;
      compute, based on the background portion, a first value representing a background complexity of the first image;
      compute, based on both the foreground and the background portions, and by using a plurality of edge maps with different scales, a second value representing a blurriness of the first image;
      generate advice for capturing a second image based on both of the first and second computed values; and
   a display unit configured to display the generated advice.

19. A method for improving the quality of a captured image, comprising:
   combining a plurality of information maps to generate a subject map of a first image;
   separating, based on the subject map, a foreground portion of the first image from a background portion of the first image; and
   computing, based on the background portion, a first value representing a background complexity of the first image;
   computing, based on both the foreground and the background portions, and by using a plurality of edge maps with different scales, a second value representing a blurriness of the first image; and
   generating advice for capturing a second image based on both of the first and second computed values.

20. A non-transitory computer-readable storage medium storing a program that, when executed by a processor, causes a computer to perform a method for improving the quality of a captured image, the method comprising:
   combining a plurality of information maps to generate a subject map of a first image;
   separating, based on the subject map, a foreground portion of the first image from a background portion of the first image; and
   computing, based on the background portion, a first value representing a background complexity of the first image;
   computing, based on both the foreground and the background portions, and by using a plurality of edge maps with different scales, a second value representing a blurriness of the first image; and
   generating advice for capturing a second image based on both of the first and second computed values.

* * * * *